United States Patent [19]
Sjoberg et al.

[11] Patent Number: 6,053,214
[45] Date of Patent: Apr. 25, 2000

[54] ORIENTED POLYMERIC PRODUCTS

[75] Inventors: Michael Borje Sjoberg, Vasteras; Jan Rolf Rydberg, Stockholm; Nils Yngve Lundequist, Virsbo; Lars Goran Hoving, Vasteras; Hans Martin Tony Josefsson, Sandhult; Stig Lennart Agren, Boras; Bjorn Axel Roland Olsson, Alingsas, all of Sweden; Jyri Jaakko Jarvenkyla, Hollola, Finland

[73] Assignee: Uponor BV, Amsterdam, Netherlands

[21] Appl. No.: 09/043,639

[22] PCT Filed: Jun. 26, 1996

[86] PCT No.: PCT/EP96/02801

§ 371 Date: Jul. 28, 1998

§ 102(e) Date: Jul. 28, 1998

[87] PCT Pub. No.: WO97/10941

PCT Pub. Date: Mar. 27, 1997

[30]     Foreign Application Priority Data

Sep. 20, 1995 [SE] Sweden .................................. 9503272
Dec. 12, 1995 [FI] Finland .................................... 955960
May 8, 1996 [WO] WIPO ....................... PCT/FI96/00261

[51] Int. Cl.[7] ................................ F16L 11/00; F16L 9/14
[52] U.S. Cl. ........................... 138/134; 138/141; 138/125
[58] Field of Search .............................. 425/144; 24/255; 260/897 B; 138/134, 141, 125

[56]        References Cited

U.S. PATENT DOCUMENTS

| 3,388,425 | 6/1968 | Detter . | |
|---|---|---|---|
| 4,053,270 | 10/1977 | Collier et al. | 425/144 |
| 4,282,277 | 8/1981 | Austen et al. | 428/26 |
| 4,640,313 | 2/1987 | Stanley | 138/141 |
| 5,228,186 | 7/1993 | Brettell et al. | 29/611 |
| 5,304,590 | 4/1994 | Merz et al. | 524/235 |
| 5,480,692 | 1/1996 | Nicolai et al. | 428/35.1 |
| 5,613,524 | 3/1997 | Martucci | 138/137 |
| 5,655,572 | 8/1997 | Marena | 138/125 |
| 5,843,539 | 12/1998 | Harvey et al. | 428/1 |

FOREIGN PATENT DOCUMENTS

| 2127746 | 1/1995 | Canada | C08F 2/50 |
|---|---|---|---|
| 0 024 220 A1 | 2/1981 | European Pat. Off. | B29F 3/10 |
| 0 317 237 A2 | 5/1989 | European Pat. Off. | B65D 65/40 |
| 0 353 977 A2 | 2/1990 | European Pat. Off. | B29C 47/02 |
| 0 530 507 A1 | 3/1993 | European Pat. Off. | F16L 11/12 |
| 0 563 721 A1 | 10/1993 | European Pat. Off. | B29C 47/90 |
| 0 571 181 A1 | 11/1993 | European Pat. Off. | B29C 49/26 |
| 35 11 371 A1 | 10/1986 | Germany | B29C 61/06 |
| 43 13 153 C1 | 5/1994 | Germany | B29C 61/06 |
| 61-002523 | 1/1986 | Japan . | |
| 84/01920 | 5/1984 | WIPO | B29D 23/00 |
| 90/02644 | 3/1990 | WIPO | B29C 47/90 |

*Primary Examiner*—Andres Kashnikow
*Assistant Examiner*—Davis Hwu
*Attorney, Agent, or Firm*—Fish & Richardson P.C.

[57]         ABSTRACT

A continuous method of extruding an oriented plastic article of improved strength. A chemically reactive polymer, monomer or other compound is included in the matrix material(s) and a (multilayer) parison is extruded or melt formed having built-in thermoplastic orientation caused by shear or caused by elongational flow. A reaction can be activated in the molten state thereof by additional heat resulting in a cross-linked structure or at least the mobility of the molecules being reduced, resulting in a longer relaxation time which makes the freezing of permanent orientation possible. The soft matrix can be stretched while still hot in the hoop and/or axial direction. Then, the product thus obtain is calibrated and cooled in an oriented state.

84 Claims, 6 Drawing Sheets

ORIENTED POLYMERIC PRODUCTS

This is a continuation of International Patent Application No. PCT/EP96/02801, with an international filing date of Jun. 26, 1996, now pending.

BACKGROUND OF THE INVENTION

This invention relates to oriented polymeric articles, and more particularly to a novel oriented polymeric article comprising an oriented crystalline or semi-crystalline thermoplastic polymeric material having improved properties and a method and apparatus for its production.

PRIOR ART

It is well known that the physical and mechanical properties of crystalline and semi-crystalline thermoplastic polymers can be improved by orienting their structures. Polymer processing methods, such as drawing, blow moulding, injection moulding and the like have all been used to fabricate articles of thermoplastic polymers having oriented structures.

In recent years, extensive studies have been directed to methods of deforming thermoplastic polymers in a solid state (ie. below the crystalline melt temperature). In these methods, the polymer is mechanically deformed to obtain a desired uniaxial or biaxial molecular orientation. The polymer may be drawn, extruded or otherwise processed at temperatures ranging from the glass transition temperature to temperatures just below the crystalline melt temperature of the polymer. Products such as strip, tubes, rods and other shaped articles, usually, but not always, having predominantly unidirectional orientation, have been fabricated by such processing methods, for example, as described in U.S. Pat. No. 3,929,960 and U.S. Pat. No. 4,053,270.

Biaxially oriented containers, such as bottles used in the soft drinks industry, are made by a melt extrusion-stretching or injection moulding-blowing expanding process. Such a process is described, for example, in U.S. Pat. No. 3,923,943. The containers are produced by stretching the polymer, typically over 250 percent. Such large stretching deformations can result in non-homogeneous deformation of the structure thereby damaging the spherulitic crystalline aggregates, causing the formation of microvoids and the enlargement of any microvoids already present in the polymer. The density of the polymer is typically decreased and the microstructural sensitive properties, such as stress whitening and low temperature brittleness, remain.

Elongate, relatively thick-walled, high strength tubular polymer products, such as high pressure hoses, tubes and pipes have been produced by plasticating extrusion methods. One such method for producing thermoplastic pipe is described in U.S. Pat. No. 3,907,961. The thermoplastic polymer is heated to a molten state and is extruded with a ram extruder through a conical shaped passage onto a flexible mandrel. A cooling system for the die set is provided to cool the surfaces of the pipe to a solidified state. The polymer is extruded in the molten state and the resultant pipe has an unoriented structure. There is no mentioning of the use of cooling for enhancing orientation.

A further method for producing high pressure pipe is described in U.S. Pat. No. 4,056,591, which is directed to a process for controlling the orientation of discontinuous fibre in a fibre reinforced product produced by melt or plasticating extrusion. The fibre-filled plastics matrix is extruded through a diverging die having a generally constant channel. The walls of the die may taper slightly so that the area of the outlet of the die is larger than the area of the inlet of the die. The amount of orientation of the fibres in the hoop direction is directly related to the area expansion of the channel from the inlet to the outlet of the channel. The product is a reinforced pipe containing fibres that are oriented in the circumferential direction to improve the circumferential properties.

While the fibres may be oriented, the polymer is substantially unoriented, since it is processed in a molten state. In other words, because the fibre reinforced polymer is processed in a molten state, the structure is not composed of platelet or wafer-like, radially compressed spherulitic crystalline aggregates highly oriented both circumferentially and axially, although the fibres added to the polymer may be oriented circumferentially and axially.

A typical method for the production of oriented polymeric pipes, for example, PVC pipes, is set forth in WO90/02644. The method includes the steps of continuously effecting an initial extrusion of a tube, temperature conditioning to a desired orientation temperature, expanding the tube by pressure within an internal pressure region and cooling. This process relies on stretching the polymeric material after leaving the die set at orientation temperature, typically 95 deg. C. for PVC. The drawback is the substantial line length required for the temperature conditioning operation.

A method of orienting polymeric pipes, for example, PVC pipes, using an internal mandrel, disposed outside the die set, is described in DE 2357078. This method also relies on temperature conditioning the pipe to a suitable orientation temperature where the stretching causes orientation of the plastics material.

Still another method which also relies on attaining a suitable orientation temperature is set forth in JP 4-19124. In this method the start up is performed in a radially expanding closed die but the die casing is removed when the orientation temperature, lower than the extrusion temperature, is reached.

Several methods for orientation of the material of a polyethylene pipe have been proposed but none of them has come into commercial use so far. Polyethylene is a highly crystalline material which can be successfully oriented below its crystalline melting point only by solid state extrusion or by using very high stretching forces in a die-drawing batch process. Above the crystalline melting point, orientation can be effected during extrusion of the pipe, but only in a very narrow temperature range. A great problem in this case is that the orientation disappears rapidly, and that only thin-walled products can be cooled rapidly enough to maintain the orientation. An example of a typical line arrangement for producing a thin walled polyethylene shrinkable pipe is described in EP 0507613.

Deformation of cross-linked polyethylene pipes is known, for example, from several patents mainly dealing with heat shrinkable products. For example, DE 2051390 describes a method of continuous manufacture of pipes formed from cross-linked polyolefins wherein the completely cross-linked material is reheated after leaving the die set, expanded, and then cooled in the expanded state. The expansion is affected by means of a mandrel. There is no mention of the degree of expansion and also no mention of orientation being effected by the expansion. The degree of cross-linking after expansion is not stated. The method is used for the manufacture of shrinkable tubes.

DE 2200964 describes a method for the production of cross-linked polymeric tubes. Typically, the cross-linking is started in the extruder head, or after exiting the die set.

DE 2719308 describes a method for the manufacture of shrinkable tubes where the crosslinking is initiated after the die. Orientation is not used for increasing the strength of the product. EP 0046027 describes another method for the manufacture of cross-linked shrinkable products.

U.S. Pat. No. 3,201,503 discloses a method for the production of cross-linked shrinkable films. In this method the molten polymer containing a peroxide is extruded in a separate cross-linking chamber and then blown into a larger diameter tubular member. The extrusion of cross-linked hot water conduits is mentioned but these conduits are not oriented EP 0126118 describes a method for the orientation of a plastics pipe wherein the pipe after leaving the die-head is passed through a heated hollow jacket in order to cross-link the material, and wherein the cross-linked pipe inside the jacket is expanded after cross-linking by internal pressure to engage the inside of a wider portion of the jacket. There is no mentioning of the extrusion temperature or of the addition of cross-linking agents, and no disclosure of axial orientation and cooling of the plastic pipe. The process also requires a long tempering tube as the pipe is essentially heated by a heat flow coming from the outside jacket only.

GB 2089717 describes an extruder for manufacturing plastic pipes with an elongated torpedo fixed to the screw end or mounted through the screw. The aim is to avoid the adverse effect of spider legs in the tooling. The patent mentions orientation but does not describe how the method would be able to produce permanent orientation in the product. The underlying concept is to utilize the internal shear from an internal rotating mandrel and the external shear caused by material flow axially (nowhere is it mentioned that the flow can be plug flow). Although the use of cross-linked polymers is mentioned in the patent there is no suggestion that cross-linking would enhance orientation. There is no information either as to where in the extruder the cross-linking would take place. The aim is to obtain a hot water pipe having an outer surface with less cross-linking in order enable welding to take place.

Orientation using a smooth mandrel is also known from EP 0563721. In this method the parison is driven over the mandrel by using a corrugator. Although the drawing shows a conical mandrel before the orientation mandrel there is no mention of any benefits of this arrangement. The mandrel is simply used in order to bring the parison into contact with the mould blocks. Also the process is based on stretching the parison after it exits the closed area of the die set.

Patents having disclosures relating to the manufacture of pipes, and/or the manufacture of composite metal/plastics pipes include, for example:

Swiss Patent no.434716, U.S. Pat. No. 4,144,111, DE 2606389, FR 1385944, Swiss Patent no.655986, EP 0067919, EP 0353977, DE 3209600, EP 0024220, U.S. Pat. No. 3,952,937, GB 2111164, DE 2923544, DE 2017433, DE 1800262, DE 2531784, DE 2132310, and EP 691193.

The disclosures of all the abovementioned patents are incorporated herein by reference in their entirety and for all purposes.

The prior art extrusion processes described above, by which tubular products consisting essentially of thermoplastic polymers are produced, are incapable of and cannot be adapted to expand a polymer by at least 100 percent in the circumferential direction in a compression-type deformation. Prior art processes for producing hoses or elongated tubular products are directed to melt or plasticating extrusion processes that generally result in the production of non-oriented products.

Prior art processes for producing large diameter containers are directed to stretching or tensioning processes in which a polymer is expanded at least 100 percent in the circumferential direction. Stretching or tensioning causes non-homogeneous deformation of the spherulitic crystalline aggregates in the polymer structure. The spherulites are ruptured and tilted. Microvoids, microfibrils and eventually fibrils are formed. Defects, such as microvoids already present in the polymer are enlarged. The resulting products are highly oriented in a circumferential direction, but have defects formed in the structure.

OBJECTS OF THE INVENTION

It is an object of the invention to produce an article comprising a crystalline or semi-crystalline polymeric material that is permanently oriented at ambient temperatures.

It is a further object of the invention to provide a deformation method that is compressive in nature whereby the problems of non-homogeneous deformation and the associated product defects are substantially obviated and an oriented spherulitic crystalline aggregate structure substantially free from such defects is obtained.

It is a still further object of the invention to provide an article comprising a crystalline thermoplastic polymeric material which is substantially free from defects caused by non-homogeneous deformation of the polymer, is oriented in both a circumferential direction and an axial direction, and has particularly improved circumferential burst strength and tensile impact strength over the ambient to low temperature range, and substantially retains the density of the polymer from which it is processed.

It is a yet further object of the invention to provide an article comprising a crystalline thermoplastic polymeric material which is expanded at least 100 percent in the circumferential direction and is expanded at least 50 percent in the axial direction, has a structure consisting essentially of discrete platelet or wafer-like, radially compressed, spherulitic, crystalline aggregates which are oriented in both the circumferential and axial directions, is substantially free of process-induced defects, such as microvoids, and has a density which is the same as or higher than the same polymer when processed into an article by prior art processes and which has an improved circumferential tensile impact strength and is less susceptible to further microstructural damage on subsequent stretching.

Other objects of this invention will appear more clearly from the following description and Drawings.

BRIEF DESCRIPTION OF THE INVENTION

In a first aspect, the invention provides an article comprising a crystalline or semi-crystalline thermoplastic polymeric material wherein the polymeric material is cross-linked, or has grafted side chains creating steric hindrance, and is permanently oriented at ambient temperature, such that the tensile strength of the polymeric material in the direction or directions of orientation is greater than the tensile strength of an unoriented article formed from the same polymeric material.

In a second aspect, the invention provides a method for the production of an oriented crystalline or semi-crystalline thermoplastic polymeric article which comprises:

(i) heating a crystalline or semi crystalline thermoplastic polymeric material to a temperature at or above its crystalline melting point;

(ii) forming the polymeric material into an article whilst at or above its crystalline melting point;

(iii) subjecting the polymeric material to shear forces and/or stretching either during or after the formation of the article to effect orientation of the polymeric material in the longitudinal and/or transverse directions;

(iv) reacting the polymeric material either before, during or after the formation of the article, either before or during orientation, or after orientation but before substantial relaxation of the orientation has taken place, with a cross-linking agent, or with a grafting agent whereby steric hindrance of polymer chain movement is increased;

the resultant article having a tensile strength in the direction or directions of orientation greater than the tensile strength of an unoriented article formed from the same polymeric material.

In a third aspect, the invention provides an extrusion apparatus for producing an oriented extrudate of polymeric material, comprising:

a) a plasticating extruder means for providing a melt(s) or partial melt(s) of said polymeric material(s) and a chemically reactive substance and for feeding said melt or partial melt under pressure through a discharge opening in said extruder means;

b) an elongational flow pattern-developing cavity means having an inlet opening communicating with said discharge opening of said extruder means, a flow cavity, and a discharge orifice, the relative geometries of said flow cavity and said discharge orifice being such as to develop within the molten polymeric material flowing from said extruder means through said cavity means an elongational flow pattern which induces molecular orientation at least transversely to the direction of flow within said molten polymeric material;

c) an orientation-retaining extrusion die means provided with an orifice extending therethrough, said die orifice having an inlet end and an outlet end, said discharge orifice of said cavity means opening into said inlet end of said die orifice so as to permit flow of the oriented molten polymeric material from said cavity means into said die means, said discharge orifice having a cross-sectional area in the range of from 0.9 to 2.0 times the cross sectional area of said die orifice;

d) temperature control means for maintaining the temperature of said flowing molten polymeric material below the reaction temperature of the said chemically reactive substance in the extruder and in at least a first part of said cavity means, and for maintaining the temperature of said flowing molten polymeric material above said reaction temperature in at least a second part of said cavity means and/or said inlet end of said die orifice;

e) optionally, temperature control means for maintaining in said die orifice an axial temperature gradient descending in the direction of flow through a median die temperature substantially equal to the normal melting point of said polymeric material so that solidification of said polymeric material will be inhibited in the entrance region of said die means and may be initiated within said die means;

f) optionally, a variable speed take-up means for withdrawing an extrudate of said polymeric material from said outlet end of said die orifice at a controlled draw rate;

the arrangement being such that said extrudate begins to solidify within said die means or after exiting from said outlet end of said die orifice but before any substantial radial swelling of said extrudate can occur.

The invention is particularly applicable to the production of hollow articles, especially elongate hollow articles such as pipes, tubes, conduits and the like, and will be more particularly described herein with respect to the production of such articles. It is to be understood, however, that the invention is not limited to the production of such articles and may find application in the production of bottles, containers, rods, wire and cable coatings, pipe fittings and other polymeric articles.

In this specification, the crystalline melting point of the polymeric material is define as the temperature at which crystals start to form on cooling the polymeric material from the melt and can be determined according to the method of ASTM-D648.

The invention is based in part on the realisation that in order for the high molecular orientation, developed within the polymeric material, for example, by its elongational flow through an extrusion die, or by stretching, to be retained in the final product, it is necessary to 'freeze' such orientation by solidifying the polymeric material before the oriented molecules have sufficient time to relax. Because of the low thermal conductivity of polymers, combined with the short relaxation times of most molten plastics materials flow-induced orientation cannot normally be locked into the final structure to produce articles with significantly improved values of modulus and strength.

In the method of the invention a chemically active substance, which can be a reactive polymer, monomer, or other suitable compound is added to the polymeric material in order to facilitate orientation of the material and thus provide a method of orientation that is suitable for practicable commercial use. The chemically reactive substance can, for example be a cross-linking agent, a grafting agent, or a reactive compound which can add bulky end groups to the polymer molecules.

The addition of such chemically active substances, for example, peroxides for cross-linking of polyethylene, is known per se in order to obtain cross-linking of the material in extrusion of hot water pipes. Typically such pipes, made of ultra high molecular weight polyethylenes, are cross-linked to a gel level of 60 to 80% in an attempt to achieve good quality and low creep properties at elevated temperatures. However, even if radial expansion of the pipe has been effected in connection with the extrusion, the sole purpose of adding a cross-linking agent has been to obtain cross-linking and thereby enhanced creep properties at elevated temperature.

Now, it has been surprisingly discovered that an addition even at very low levels of a cross-linking agent has a dramatic effect on the orientability of plastic materials. For example, when extruding and orienting polyethylene pipes at 200 degrees there would be no way of reaching permanent orientation because the stress in material would immediately relax away. However, with a slight cross-linking of the polymeric material to a degree of 1 or 2% or more, preferably 10–20%, before orientation, we have found that there is still a considerable, for example, more than 50%, enhancement of the strength properties of the product after orientation. Similar effects are obtainable by grafting bulky side chain molecules onto the polymer chains as will be described hereinafter. In this specification, the degree of cross-linking is expressed in terms of gel content, as measured by ANSI/ASTM D2765-68.

The addition of a cross-linking agent before or during the extrusion of a polymeric material in order to facilitate orientation is also described and claimed in our co-pending Swedish patent application no. SE 9503272-8, the entire disclosure of which is incorporated herein by reference for all purposes.

In comparison with the prior art technology, where the extrusion temperatures have been well below 150 degrees, in the present invention, the temperature range over which orientation of the polyethylene material can be achieved is dramatically broadened: the feasible temperatures in this process typically range from 135° C. to 250° C., the preferred process temperature being around 180 deg.C for practical reasons.

Even more interesting, is that the invention has been found to be applicable to many different polymeric materials. Formerly, the polyethylene (PE) grades that could be oriented were special, high priced polymers with specific molecular weight distribution and comparatively high molecular weight. The method of this invention enables a much greater variety of polymers to be used. For example low cost LDPE when partly cross-linked and mixed with high molecular weight PE will enhance dramatically its orientation capabilities even at low concentrations.

In a further embodiment, the invention provides a reactive extrusion method, if necessary with appropriately adapted extruders or conical dies, which leads to improved orientation in the polymer matrix wherein the immobilization of the molecule chains is achieved not by cross-linking but by grafting reactions or end group addition, wherein a side or end group of considerable size is joined to the chain. The steric hindrance thus obtained improves the orientation properties of the matrix. This will no doubt give interesting possibilities especially in the field of biopolymers. Preferred grafting reactions are, for example, melt free radical grafting reactions using monomers capable of introducing bulky side groups. Suitable monomers can comprise, for example, oxazoline groups, and a specific example is ricinoloxazoline maleinate (OXA). The grafting reaction, using polypropylene as an exemplary crystalline thermoplastic polymeric material, is illustrated in FIG. 6 herewith. In this reaction, the degradation to b-scission is preferably minimised, for example, by the addition of suitable quinones or other means. It will be apparent that by varying the size of the group R the properties of the polymeric material and the effect on orientability can be optimised. The percentage of reacted side or end groups joined to the polymer chain can vary from 1 to 100% as desired.

During the development of the new polymeric article another phenomenon was unexpectedly discovered. If the mobility of the molecule chains can be reduced, a stronger oriented product can be obtained. For example, it has been found that the addition of fibre-like additives to the polymer matrix increases the product strength more than would be evident in normal technologies (without subsequent molecular orientation). Without wishing to be bound by any particular theory, it is believed that the fibres, especially when using the novel extrusion techniques described elsewhere in this specification, tend to immobilize part of the polymer matrix thus forcing an additional molecular orientation to be generated in addition to the fibre orientation. Somehow these fibres may act as effective nucleating agents that bring a favourable structure to the partly crystalline oriented matrix.

In a preferred embodiment of the invention, it has further been found that by inducing shear orientation to the matrix or by inducing draw over the cross-section before the cross-linking or grafting takes place, the polymeric material can become even stronger. It is believed that this embodiment of the invention, where the molecules are pre-aligned with thermoplastic orientation before cross linking or grafting, when used for manufacturing oriented thick walled products, brings out the strength of the molecule chains better than in the case where the matrix is cross-linked or grafted in a random state (i.e. where the chains are cross-linked freely) and it seems that the carbon-carbon strength of the aligned chain can be greater than the strength of bonds achieved by normal cross-linking.

Finally, although the invention is not limited to any particular theory, it is thought that the effect of cross-linking or grafting on orientation is basically related to the principle of using well adhered fibres as an immobilization vehicle for the matrix. The cross-links probably work as 'in situ' fibres.

This basic principle means that in the present invention it may also be possible to get better than predicted oriented products by using liquid crystal plastics (LCP) in the matrix in order to enhance molecular orientation. Also, for example, it may be possible to blend low viscosity PE impregnated with a cross-linking agent with higher viscosity PE, and extrude the mix from an extruder giving a helical distribution of the mass, with the result that in the final oriented product there is produced an interlacing orientation field of cross-linked molecules stemming mostly from the LDPE embedded in a partially oriented matrix.

The novel polymeric articles of the present invention are permanently oriented at ambient temperature, which is to say that the orientation is substantially retained unless the temperature of the article is subsequently raised to an elevated temperature at which polymer chain mobility again becomes evident. The amount of orientation in the plastics material can be detected by any suitable method, for example, by infra-red spectrophotometry combined with a wire grid polarisator. The results of the measurement of absorption peaks can be mathematically analysed and a feedback can be connected to a process control system for the extrusion apparatus, for example, the control system for the extruder and heating units. Thus it is possible to arrange for the orientation of the polymeric material to be controlled by an automatic process control system.

Other novel effects can be obtained using certain embodiments of the method of the invention. A desired balance between axial draw and diametral draw can be readily mastered in this process. Normally in orientation the measures for effecting this balance are limited. Controlling extrusion or haul off speed is one possibility, but this easily leads to unnecessary high orientation in the axial direction.

In this specification, axial draw ratio is defined as:

new length after drawing /
original length × square root of diametral draw ratio,
and
diametral draw ratio is defined as:
new mean diameter /
original mean diameter.

The method of the invention can be used, for example, to produce novel oriented thermoplastic pipes having controlled degrees of biaxial orientation in the axial and hoop directions, and more particularly having a tensile strength measured in the hoop circumferential direction which is, for example, at least twice the tensile strength measured in the axial direction. This combination represents the optimum combination for burst strength of unconfined pressure pipe. The process of the invention, however, gives almost unlimited control possibilities. For example, when using initial shear induced orientation, one is able to produce a 'feed stock' or parison containing primarily totally hoop directed molecules. When this parison is then (further) cross-linked and expanded onto a mandrel, a product with enhanced radial orientation is obtained. Now, when exiting the die-set, the haul off speed can be adjusted so that the hoop orientation opens up in the axial direction, generating a net-like interlaced orientation structure easy to balance to obtain the desired properties. The specific process needs or limitations no longer dictate the product properties and optimised properties can be achieved. For example, when a closed die system is used the polymeric material can be pushed over a mandrel and no axial draw is necessary.

In a particularly preferred embodiment of the method of the invention, the polymeric material is oriented in a plurality of stages, which can, for example take place before and after cross-linking or grafting. In another aspect, accordingly, the invention provides a method of forming and continuously orienting a product comprising polymeric material(s) at a temperature greater than the crystalline melting temperature of said material(s), characterized by the steps of:

adding a chemically reactive substance(s) to the polymeric material before or during forming of either the entire product, or to one or more layers of a multilayer product, or to axial or helical stripes of the product, or to certain segments of the product in the axial direction;

plasticizing and forming a parison of the polymeric material(s) thus prepared at a temperature not high enough to activate the reaction of the said reactive substance(s);

optionally, inducing shear at least to the layer(s) where the chemically reactive substance(s) have been added to and/or stretching the still soft parison in one or both of two directions, simultaneously or stepwise, said stretching including axial draw to effect thermoplastic orientation of the material in the longitudinal direction of the parison and/or radial expansion to effect thermoplastic orientation of the material in the hoop direction of the parison;

decreasing the mobility of the molecules in the layer(s) to be oriented by activating a chemical reaction between the chemically reactive substance(s) and the polymeric material(s) having the chemically reactive substance(s) added thereto when the polymeric material(s) still is/are in a molten state during extrusion and allowing the reaction(s) to proceed to a degree ranging from 1,0 to 100 % calculated from the number of chemically reactive groups;

inducing shear at least to the product,layer(s), stripes, or segments to which the chemically reactive substance(s) have been added and/or stretching the still soft, at least partly reacted parison in one or both of two directions, simultaneously or stepwise, said stretching including axial draw to effect orientation of the material in the longitudinal direction of the parison and/or radial expansion to effect orientation of the material in the hoop direction of the parison;

calibrating and cooling the parison in the oriented condition to make the orientation permanent at least in the layer(s) where the chemical reaction(s) has taken place.

In another particularly preferred embodiment of the method of the invention, the polymeric material can be subjected to a further cross-linking in a further cross-linking stage after the initial orientation and cross-linking or grafting has taken place. It has been found that, whereas a degree of cross-linking of from 1 to 80%, preferably at least 2 to 80% is enough to increase the orientation temperature range sufficiently in many instances, further cross-linking of from 99 to 20% can be effected in order to improve dimensional stability still further.

The further cross-linking can be carried out, for example, by irradiation, using gamma radiation or electron beam radiation. Preferably, however, the further cross-linking is carried out by activation of residual cross-linking agent in the polymeric material, for example, by heating. The residual cross-linking agent activated in this way can be a remaining portion of a cross-linking agent involved in the initial cross-linking reaction, or another cross-linking agent which is activated at a higher temperature. The further cross-linking need not necessarily be carried out at the time of manufacture of the polymeric article. For example, the further cross-linking could be carried out after a pipe has been laid and bent into a desired shape. In this case, further cross-linking could be carried out, for example, by re-heating the pipe by means of an electrical heater, which could be incorporated into the pipe as a conductive metal or plastics layer during manufacture. The electrical heater could be arranged to activate residual amounts of cross-linking agent, for example, a peroxide, deliberately left in the polymeric material of the pipe.

In a still further aspect of the invention, the process can be used to give novel products having very interesting new properties. Because the orientation can be 'activated' in any part or layer of the product, for example, with the help of magnetic, dielectric or microwave induced heating, products having specific properties can be engineered.

For example, tubular products with an inert inner layer or internal wall, a chemically cross-linked load bearing oriented middle layer and a radiation or photoinitialized cross-linked outer layer can be formed. Likewise the manufacture of three layer pipes with cross-linked polyethylene (PEX)-foam in the middle layer and an oriented media pipe inner layer becomes feasible with this new technique. Both physical and chemical foaming agents can be used, as appropriate, and after orienting the body of the polymeric material, the layer comprising the foaming agent can be expanded to an extent controlled by any internal and external cooling after leaving the die set and by any calibration unit used.

Also, by using, for example, a process similar to that described in WO90/08024, if the central mandrel is made conical, and force is applied to the extruded product , as described, for example, in WO93/25372, oriented pipe bends can be produced.

According to yet another aspect of the Invention, the manufacture of other novel hollow products, for example pipes, with tailor-made properties is facilitated. The product to be manufactured can be, for example, a composite product such as a multilayer pipe wherein the layers may be of different plastic materials, or a pipe with axial stripes of different plastic materials. The layers or stripes can be cross-linked or non-crosslinked, and where they are crosslinked they can include different cross-linking agents. The expression 'different materials' also includes materials of the same chemical composition but crosslinked to different degrees ranging from 0 to 100%.

By the addition of a cross-linking agent to only that section of the product that is to be oriented, products with greatly varying properties can be made, such as products wherein, for example, an inner layer is made of non-oriented material to have better abrasion resistance, while an outer layer of pigmented non-oriented material can be advantageous due to better welding properties.

In a further aspect of the present invention, elongate, composite tubular articles such as pipes can be produced comprising an oriented crystalline or semi-crystalline polymeric layer and a tubular layer of a different material, for example, a metal layer.

The tubular layer of different material can be pre-formed, for example by extrusion, or formed in situ by helically wrapping a sheet or strip of the material and welding, for example, by continuous butt welding or ultrasonic welding, or mechanically interlocking, the adjacent edge regions. Where the different material comprises a metal pipe which is formed in situ, the metal sheet or strip can be formed into a pipe adjacent to the extruder orifice, so that the polymeric material is extruded inside an already formed metal pipe. For example, an orientable polymeric material may be melt extruded in an extrusion apparatus comprising an annular orifice having a diametrically diverging geometry whereby the molten polymeric material is circumferentially oriented and pressed against the inner wall of the metal pipe or tube, for example, by using a mandrel. Alternatively the metal strip can be helically wrapped around the extruded oriented polymeric material pipe, for example, by rotating the extruded pipe. In the latter case, it may be necessary to support the extruded pipe on a mandrel, which can also be used to expand and orientate the polymeric material.

A suitable material for forming the metal pipe or tube is aluminium foils which can have a thickness ranging, for example, from 0.2 to 5 mm. Preferably the metal is coated with an adhesion promoter. The inner surface of the metal strip or sheet is preferably also roughened or serrated in order to improve the adhesion properties. If desired, it is also possible to use corrugated sheet or strip to form the wound metal pipe.

Where the different material comprises a pre-formed metal pipe, the pipe can act as a heat sink to conduct heat away from the oriented plastics material layer more quickly and assist in retaining the orientation thereof.

The method of the invention can be applied advantageously, for example, to the method for producing multilayer metal composite hollow articles as described and claimed in our co-pending International patent application no. PCT/FI96/00359, the entire disclosure of which is incorporated herein by reference for all purposes.

In a further embodiment of the invention, a composite tubular article can be formed by extruding the plastics material over an elongate member comprising a different material, for example, a tubular member such as a metal pipe, or a solid core, for example a metal cable. In this embodiment also, the metal pipe or cable can act as a heat sink, cooling the extruded plastics material as it comes into contact with the pipe or cable.

Where the polymeric material is extruded into contact with a metal pipe or tube, the polymeric material can then be oriented, or further oriented, by transporting the pipe or tube at a speed greater than the extrusion speed, thereby imparting an axial draw to the extruded polymeric material. The axial draw can be, for example, of the order of 100 to 400%, and further external cooling can be provided as required.

Where the metal layer is the outer layer, it can be protected by coating with another extruded layer of polymeric material, for example using a further extrusion line and an offset die. The extruded outer coating of polymeric material is cooled by and adheres to the metal layer, and can also be drawn so that the coating forms a strong axially oriented polymeric outer layer.

Similarly, elongate, composite tubular articles comprising an inner or outer layer of oriented plastics material and a different material comprising a fibrous layer, a plastics layer with fibre reinforcement, or a composite layer comprising multiple layers of aluminium and plastics material can also be produced.

Composite metal pipes as described above, utilising the combined strength and physical properties of the metal layer and the oriented polymeric material layer, can possess a very high hydrostatic strength, and can have very high permeation resistance and excellent impact strength. When combined with a foamed insulation layer as described herein, these properties can make them especially suitable for large bore oil and gas applications. For example, they are especially useful in high pressure trunk lines operating up to about 60 bar. The combined ring stiffness of the metal and oriented polymeric material layers can enable the pipe to respond elastically to large deformations, for example due to soil stress, without failure.

Although it is possible using the method of this invention to produce oriented pipes which are stable at both ambient and elevated temperatures (i.e. not heat shrinkable), in another aspect the invention can be used for the manufacture of heat shrinkable articles with interesting properties. Such articles are stable at ambient temperatures, but when raised to an elevated temperature they assume a new shape. For example, in a multilayer pipe having layers of different materials the layers may have different shrinkage properties, which makes the pipe behave in a unique way when heated, especially if a rotating die technology has been used. For example, if a pipe has an oriented outer layer of crosslinked polyethylene, (PEX), and an inner layer of non-crosslinked polyethylene, (PE), the composite pipe will bend slightly if heated above the glass transition temperature (Tg), depending on i.e. relative wall thickness and centring of the layers. Also, the inside PE layer may assist in preventing the whole bent pipe from losing internal diameter when heated if made strong enough by the use of fillers.

The incorporation of fillers into at least the non-crosslinked layer of a multilayer product is often beneficial because the improved thermal conductivity improves cooling and increases the possibility of preventing fast relaxation, hence making permanent orientation easier to achieve.

In general, the incorporation of fibres can very effectively stop the PEX tendency to shrink back (relax), which also makes postforming operations like socketing of pipes easier. Hence it can be seen that a pipe that is fibre reinforced, crosslinked and oriented offers an optimized set of properties needed for a variety of piping applications. The inclusion of fibres into highly viscous olefin (co)polymers is not very easy, and therefore a separate layer of softer material, wherein the blending can more readily be done, is sometimes highly beneficial.

A suitable method for producing an article comprising a polymeric material comprising oriented fibres is described and claimed in our co-pending Finnish application no. FI 960768 the entire disclosure of which is incorporated herein by reference for all purposes.

Compared to non-oriented homogenous pipes that exhibit the same modulus in all directions, the oriented pipes of the invention are already an improvement because, for example, by varying the draw directions and ratios, the hoop strength can be easily double the axial strength, a common requirement in pressurized pipelines. By adding fillers the possibilities to build up the strength of the composite become multiplied. This is especially true for flake-like fillers like mica, for example, which exhibit better than normal barrier properties when embedded in a cross-linked structure.

A multilayer product having an inner non-oriented layer and an oriented PEX outer layer can also give interesting properties if, for example, the inner layer has a higher melting point than the softening point of PEX, which is around 130° C. The inner material could be, for example, a polypropylene (PP) grade, which additionally shows very sudden softening. This combination could be used as a fast shrink and/or electrofusion sleeve that additionally can generate high shrinking forces. Adhesion between the inner layer and the outer layer can be achieved, for example, by using an intermediate adhesion layer between the inner and outer layers. A suitable adhesion layer can comprise, for example, a blend of a PE and a PP having substantially the same melting points together with a compatibiliser.

The use of non-crosslinked material surface layers on both sides of the oriented product can greatly improve the orientation process because these layers can be used to minimize friction against the tooling. When, for example, silicone oil is mixed only with a thin surface skin layer it will not substantially disturb the cross-linking process and the consumption thereof is greatly reduced compared to mixing with the whole bulk of the product.

A typical problem in extruding PEX pipes is that residues of peroxide collect in the extrusion head and have to be removed on a daily basis. This problem can be overcome by providing non-crosslinked material on both sides of the product. Considering drinking water quality a specially beneficial alternative for the non-cross-linked inner material is a polymer that is impermeable to residues which are formed in the cross-linked section of the product due to chemical reactions during cross-linking.

In conventional orientation of polyolefines the molecule chains are elongated and stressed under influence of the stretching force. On the other hand this phenomenon is counter-balanced by so-called relaxation, which tends to restore the molecular chains to the coiled, disordered condition. In the process of the invention the cross ties or interference between the chains prevent the extremely rapid relaxation so that the draw speed need not be so limited to obtain suitably balanced values. However, the material to be oriented may be, after cross-linking, at the processing temperature, in a glassy state and hence rather brittle. Hence the stretching rate should not be too high, because otherwise the melt may react elastically and break due to its brittleness. It has been found that polyolefin compositions with wide molecular weight distribution do not break so easily. Surprisingly, it has been found that, when the material is suitably chosen, the skin layers on the product greatly enhance the available stretching rates, and can carry the brittle layer without rupturing. The brittleness of the cross-linked layer itself can also be improved by a careful choice of the molecular weight distribution of the polymeric material, or by the use of additives known in the art which improve melt strength.

On similar grounds a process that does not rely on stretching too much is preferred.

TABLE I

| Degree of cross-linking % strength at | Increase in tensile break % |
|---|---|
| 22 | 75 |
| 33 | 88 |
| 60 | 116 |
| 87 | 128 |

Table I above illustrates the improvement obtained by the method of the invention. The right hand column indicates the increase in tensile strength at break for PEX samples cross-linked and uniaxially stretched 100% at 170° C. during orientation of the material compared to cross-linked, non-stretched samples. The table shows the permanent difference in strength of the samples as a function of the degree of cross-linking. It also shows that achieving permanent orientation and enhanced strength properties at high draw temperatures is most unlikely to be achieved unless the molecules are tied, for example, by cross-linking before drawing.

In a further example, when a 0.8mm thick PEX sample is cross-linked to 80% and drawn, at a temperature of 200 deg.C., to an elongation of 500%, a tensile strength of 182 Mpa is obtained. In many experiments, it has been determined that the tensile strength of the oriented material is a linear function of the draw rate.

In the above examples, the density of the uncross-linked PE raw material is 955 kg/M$^3$. The density of a cross-linked (70% gel content) sample of the same PE is 929 kg/m$^3$. The corresponding density of a cross-linked and oriented sample is 938 kg/m$^3$. Thus it can be seen that the method of the invention provides products having a higher density than those produced without orientation of the polymeric material.

The invention is particularly applicable to the production of relatively thick walled pipes, especially those wherein the ratio of wall thickness to diameter is at least 1:100, preferably greater than 2:100, more preferably greater than 3:100.

The dimensions of plastics pressure pipes and vessels are determined using the hydrostatic design base established by long term pressure resistance data and regression analysis. Normal HDPE grades have a design base of 6.3 MPa and the very best contemporary high molecular weight PEs have a design base (MRS) of 10 MPa. The tests shown in Table 1 above were made with cross-linked PE having typically a design base of 8. Oriented pipe samples of the same material produced in accordance with the invention can have a design base of at least 12 Mpa up to 16 Mpa or higher.

One of the problems encountered when designing high performance plastics pipes for pressure and pressure sewage use is that even if the high allowed sigma value (allowed long term stress in the wall), which is the base for dimensioning the pipe wall to withstand pressure, would allow rather cost effective pipes with relatively small wall thickness, in practice because of other restrictions. For example, if the sigma value is increased from today's 8 N/mm$_2$ (PE 100) to a level of 16 or 20, which is possible with orientation according to the present invention, the wall thickness gets so thin that the ring stiffness of the pipe installed underground may cause the pipe to buckle when subjected to pressure surges. Although the modulus of the material increases somewhat because of orientation this is not enough to compensate for the reduced wall thickness because the ring stiffness follows the third power of the wall. Although fillers like fibres etc effectively increase the modulus a more effective way is just to increase the wall thickness. This becomes, however, expensive and a new method of making stiff oriented pressure pipes is required.

The above problem can readily be solved as described earlier in this specification by using a pipe wall having a multi-layer construction. This construction can have one or several oriented layers in the product which provide pressure resistance, a middle layer which consists of plastic foam and an outside layer protecting the whole structure. It can be made by extruding and orienting the whole structure. The inner layer will be permanently oriented because the crosslinking agent incorporated is activated. The middle layer consisting of, for example, polyethylene, together with a foaming agent which also begins to react because of the increased temperature, forms a foamed layer around the pressure pipe core. The outer layer, which typically would be of softer, ductile material, follows the expansion during orientation and subsequent foaming step and forms the outer protective layer which typically would also contain all the necessary stabilisers, dyes etc.

The final pipe can also be coated, or provided with release agents and another release layer, which subsequently can be peeled away.

Typical foaming degrees are up to 50% (of original middle layer density). But excellent pressure pipes with a very lightweight foam can also be produced, with foam densities of less than 500 kg/m$^3$, for example, densities down to 30 kg/m$_3$. In this latter case the soft middle layer also acts like an excellent cushion against disturbances caused after pipe laying. In tests performed, foams containing simultaneously fibres or fibre like materials such as Wollastonite, appear to offer exceptionally good strength characteristics.

It is also possible to extrude oriented pipes having more than one foam layer using the method of the invention. For example, a multilayer pipe may be extruded having two foam layers of different density. Multilayer pipes incorporating a metal layer and one or more foam layers can also be produced. Examples of such products include; a multilayer pipe comprising an oriented PEX inner layer, an adhesion layer which can be foamed, an intermediate metal layer, a second adhesion layer which can be foamed, and a protective outer layer; and a multilayer pressurised sewer pipe which comprises a thin oriented PEX inner layer, a first intermediate layer comprising a rigid foam optionally including fillers, for example at least 10%, preferably about 25%, of calcium carbonate, to increase its ring stiffness, a second intermediate layer comprising a protective flexible foam, and a protective outer layer, preferably including a UV stabiliser, which can be a further crack resistant PEX layer.

Pipes having a thin oriented inner layer, a fibrous mineral filled foam middle layer, and a cross-linked outer layer are particularly suitable for use in sewer pipe applications. The cross-linked outer layer can be formed from a scratch resistant polymeric material which allows "no sand" installation, the middle layer can be sturdy with a relatively high stiffness, and the inner layer can provide a pressure tolerant waterway wall. A further application of such pipes can be in "no dig" installation methods wherein the pipe is pushed through the soil.

The present invention can also be used to produce a multilayer oriented plastics material pipe comprising an inner pipe and an outer pipe forming an inner layer and an outer layer, respectively, and between said layers an intermediate layer of a softer material than the inner pipe. Such a pipe, and a method for its manufacture, are described and claimed in our co-pending Finnish applications no. FI 955960 and 961822, the entire disclosures of which are incorporated herein by reference for all purposes.

It has also been surprisingly discovered that not only are the oriented products of the invention extremely strong, but that in many cases the clarity of the product is greatly improved. For example, with cross-linked polyethylene (PEX) totally transparent products can be formed which may find application for bottles and other uses. PEX products are not normally clear. Transparent, oriented, cross-linked PE articles produced in accordance with the invention can find many applications because of the low permeability of the material. Both cross-linking and orientation improve the diffusion properties of the material.

The invention facilitates joining of pipes having a spigot end and a socket end, which have been produced by the method of the invention. A sealing ring is mounted on the spigot end of one pipe and is located in the intended position by a gripper, for example, a metal ring, or by double-sided sand paper wrapped around the pipe. The socket end of the other pipe is widened mechanically, and the spigot end with the sealing ring is pushed into the socket. After a short time, for example, about 15 seconds, the socket has returned to its original condition clamping the sealing ring between the inside of the socket and the outside of the spigot with higher force than in normal PEX-pipes.

In one preferred embodiment of an apparatus according to the invention, the product is fabricated by melt extrusion of the polymer in an apparatus including an annular orifice having a diametrically diverging geometry and (preferably but not essentially) converging walls and orifice area, whereby the polymer is substantially simultaneously elongated circumferentially and axially.

In understanding those embodiments of the present invention wherein orientation takes place within a closed die, two influencing factors should be borne in mind. Firstly, since relaxation of the oriented molecules requires expansion in volume or in cross-section flow, it cannot easily occur within the extrusion die orifice of the apparatus of the invention due to the radial constraining action of the walls thereof. However, as soon as the polymeric material exits from the outlet end of the extrusion die, it is no longer subject to such radial constraint, and any unsolidified oriented molecules will tend to relax, thereby causing radial swelling of the product, unless, as in the present invention, there is a thick enough rigid skin layer present and/or polymer chain mobility is limited. Secondly, the closer the oriented molten polymeric material is to its melting point, the longer is the time necessary for relaxation to occur.

In another preferred embodiment of the invention, wherein the product is oriented in the hoop direction using a closed die, a haul off is only used to balance the properties of the product. This process is very easy to run compared to existing processes, and can produce continuous orientation of practically all thermoplastic polymeric materials, from biopolymers and rubbers to engineering plastics.

In addition, the same principle can be used, for example, for the manufacture of oriented injection moulded parts with no weld lines, for the production of oriented, fibre reinforced blow moulding parts, coated cable structures or bi-oriented films or sheets, and for the manufacturing of thick walled sheets using calendaring techniques.

The oriented polymeric articles of the invention can be joined by any suitable conventional technique, for example by the use of mechanical fittings, heat shrinkable sleeves and fittings, and fusion techniques, including welding, and, especially, electrofusion fittings and joints. The method of the invention can also be used to produce oriented polymeric pipe fittings, for example, by injection moulding. In a particularly preferred embodiment, the invention provides for the production of oriented electrofusion pipe fittings by injection moulding an oriented polymeric material around an electrofusion heating element. Examples of (unoriented) electrofusion pipe fittings which can be produced by the method of the invention in oriented form are described in EP 0591245, EP 0260014, EP 0243062, EP 0353912, EP 0189918, and WO 95/07432, the entire disclosures of which are incorporated herein by reference for all purposes. Oriented electrofusion pipe fittings according to the invention can be used to join unoriented plastics pipes, but find especial application in the joining of oriented pipes which have also been made using the method of the invention. The advantage of such oriented electrofusion pipe fittings is that they can be much stronger than conventional unoriented fittings, and also that the pressure which is required to be developed during electrofusion jointing can be enhanced by the retraction (shrink) force which can be generated by the tendency of the oriented polymeric material of the body of the fitting to recover when heated by the electrofusion heating element.

In the jointing of multilayer composite polymeric articles according to the invention, for example, pipes having an intermediate metal layer, which, if unprotected, may be subject to corrosion, a novel method of fabricating the pipe ends may be used. In this method, the outermost layers of the pipe can be removed, preferably in the factory, and an inner layer of weldable polymeric material exposed. This inner layer can then be folded back 180 over the pipe end to cover and protect the pipe end and to be welded against the outer wall of the pipe. In this way, the former inner layer of the pipe becomes the outermost layer, gives good sealing against corrosion, and provides a good welding surface for normal welding and jointing techniques such as electrofusion.

DETAILED DESCRIPTION OF THE INVENTION

Embodiments of apparatus according to the invention will now be described in detail by way of example only with reference to the accompanying Drawings in which.

FIGS. 5(a) and (b) show in diagrammatic form, two embodiments of apparatus according to the invention for the manufacture of a composite metal/plastics pipe.

Figure 6:
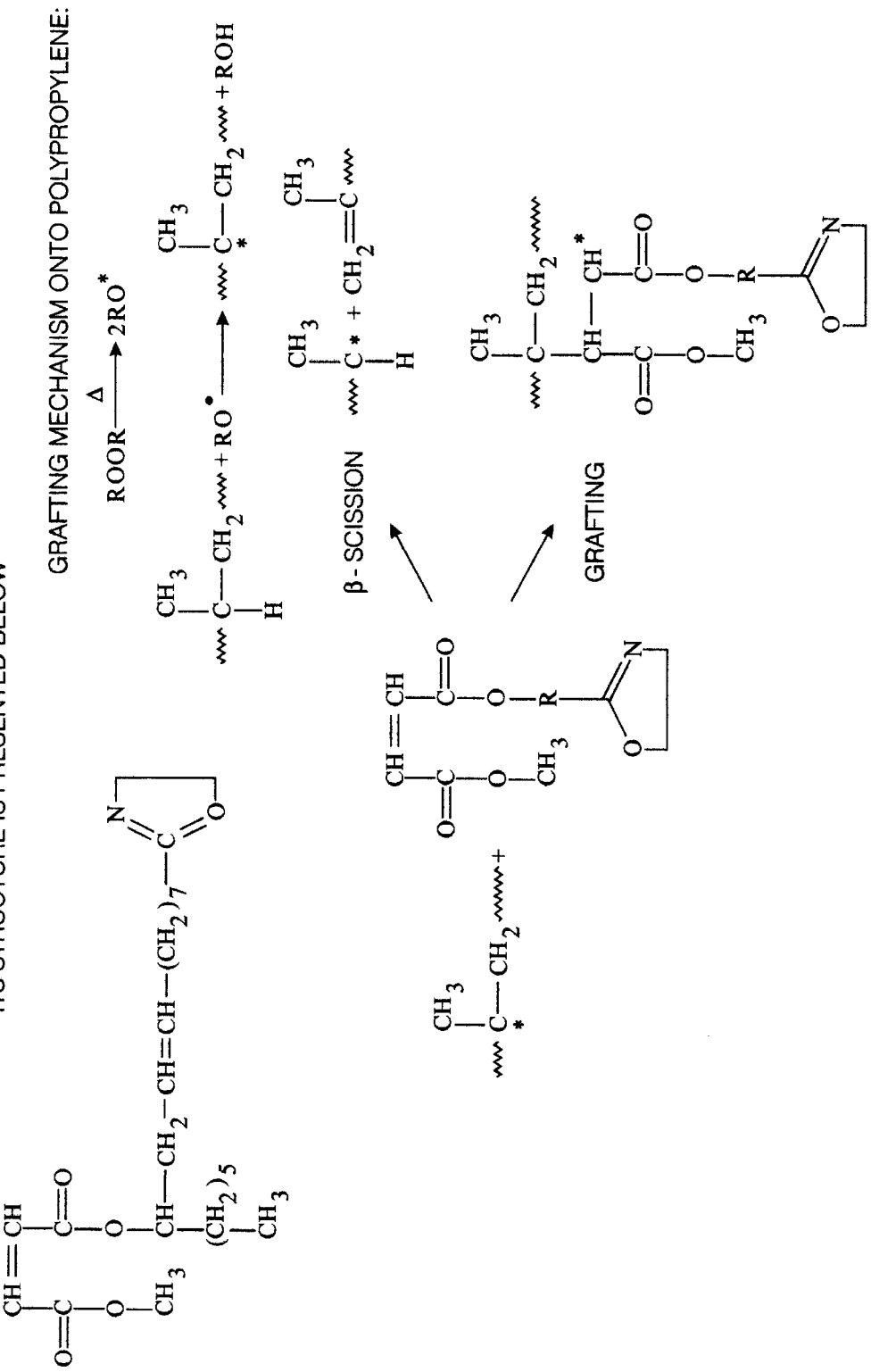

FIG. 6 shows a mechanism to graft ricinoloxazoline maleinate (OXA) onto polypropylene.

In the Drawings the extruder itself is not shown, although in most cases a conventional screw extruder can be used. Certain materials with very high molecular weight may require ram extruders (piston extruders) or the like instead of conventional screw extruders. Also multilayer products can be extruded by means of ram extruders by applying suitable crosshead technology.

In FIGS. 1 to 3 and 5, the pipe is radially expanded using a mandrel, which preferably is supported at a first end by the extruder body, for example, by using a support member extending through the extruder screw, and/or optionally at a second end by a calibrator, for example, wherein the mandrel or a support member therefor rests on the solidified wall of the polymeric material extrudate passing through the calibrator.

It is important that at least the layer to be oriented preferably is extruded with a tooling system that is totally spider free, e.g. the mandrel is supported upstream of the material flow and hence gives a flow without any weld lines. The need for this is due to brittleness of many glassy state cross-linked polymers. Any spiders in the flow of material that has begun to cross-link will have detrimental effects to the hoop strength of the product, and this becomes clearly visible when trying to expand the parison. Very effective in minimizing the detrimental effects of weldlines are certain cross-heads with rotating die-sets. A rotating mandrel with counter rotating sleeve can also give a desired fibre orientation in the hoop direction where fibres are added to the plastics material. Examples of suitable arrangements can be found, for example, in FI 83184, GB 2089717, GB 1325468, U.S. Pat. No. 3,244,781, WO90/15706, WO84/04070, EP 057613, the entire disclosures of which are incorporated herein by reference for all purposes.

(i) Orientation After Extruder Die

Figure 1:
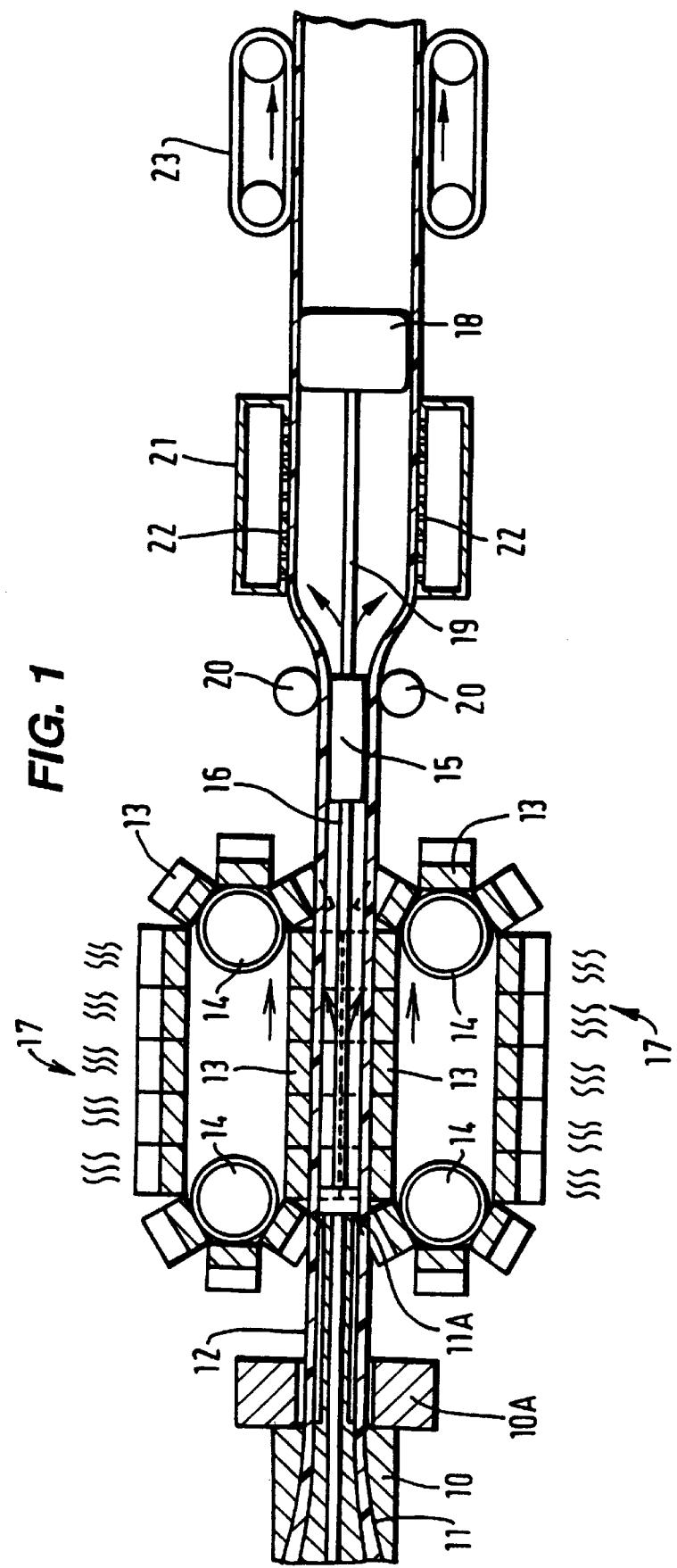
FIG. 1 shows a first embodiment of a pipe extrusion line for practising the method of the invention in axial cross-sectional view.

In FIG. 1 there is fragmentarily shown a die 10 and a fixed core 11 which form part of an extrusion head of a conventional pipe extruder (ram or screw extruder) and define an annular die opening. The inner core projects from the extrusion head and forms at its free end a mandrel 11A.

An olefin (co)polymer material, together with a suitable quantity of cross-linking agent, is plasticized in the extruder and is discharged from the end of the extruder as a cylindrical tubular extrudate 12 having a relatively large wall thickness. At the discharge opening of the extrusion head there is provided a heater 10A such as a radiation heater, for heating the tubular extrudate to a temperature which is sufficient in order to cross-link the material thereof to a degree ranging from 1 to 100%.

Downstream of heater 10A there are provided along the path of the tubular extrudate two opposite circulating trains of concatenated mould halves 13 which are moved in an endless path over drive sprockets 14. Along the path of the tubular extrudate the mould halves are guided by means, not shown, to come together at mandrel 11A and to form a bipartite mould forming a cylindrical mould cavity enclosing the tubular extrudate. The mould halves are driven along the path of the tubular extrudate in the direction of movement thereof at the same speed as that of the extrudate.

A mandrel 15 is located inside the tubular extrudate and is attached to the extrusion head by means of a bar 16. Through a passage in the bar a gaseous fluid such as air or an inert gas is supplied to the interior of the tubular extrudate in the space defined between mandrel 11A and mandrel 15 in order to keep the wall of the tubular extrudate engaged with the surfaces of the bipartite mould cavities. The mould halves 13 are heated at a suitable location in the endless circulation path thereof, e.g. at 17, by suitable heating means operating with fuel burners or electric resistance elements. When the extrudate wall contacts the heated bipartite moulds heat will be supplied to the polyethylene material to maintain said material at the cross-linking temperature for a period sufficient to reach the desired degree of cross-linking.

Downstream of mandrel 15, a plug 18, preferably of a balloon type, is provided in the tubular extrudate said plug being anchored to mandrel 15 by means of a rod 19. Pressurized fluid is supplied to the balloon plug through passages in rods 16 and 19 to keep the plug inflated in sealing engagement with the inner surface of the tubular extrudate. In the space between mandrel 15 and plug 18 a pressure is maintained by means of fluid such as air or inert gas supplied to said space through passages in rods 16 and 19 said pressure being higher than the pressure maintained in the tubular extrudate between mandrel 11A and mandrel 15. The tubular extrudate, which is still soft, will be exposed to free expansion radially allowing hoop stretching of the wall thereof under the influence of this higher pressure to form a tubular member with a larger diameter than that of the tubular extrudate leaving the extruder, and with a wall thickness that is reduced in relation to the wall thickness of said extrudate.

Outer support rollers 20, which may be connected to a drive mechanism to improve the process control possibilities, are provided at mandrel 15 to sealingly engage the tubular member against said mandrel, and a calibrator 21 is provided in the path of the tubular member located in a position where the pipe has been expanded. Calibrator 21 forms a passage determining the outer diameter of the finished tubular member and provides cooling for the tubular member by the supply of cold water which is distributed over the outer surface of the tubular member through apertures 22 in the surface of the calibrator which is engaged by the moving tubular member. In a further embodiment, the calibrator can be omitted and replaced by a conventional corrugator when a corrugated oriented pipe is to be produced.

The cooling of the tubular member is sufficient to solidify the polymer material so that the tubular member when exiting from the calibrator 21 is a rigid pipe downstream of the calibrator. A take-up device 23 is provided which engages the outside surface of the rigid pipe and operates to impart to the pipe axial traction. The speed of the take-up device preferably should be adjustable so that the positive traction force imparted to the moving pipe can be controlled. It should be mentioned that the traction force could also in special cases be negative because the pipe gets shorter during expansion if not drawn.

After hoop stretching of the at least partly cross-linked olefin (co)polymer material by expansion of the tubular member between mandrel 15 and calibrator 21 and the axial stretching of the pipe effected by take-up device 23, the finished pipe should preferably have a relationship between wall thickness and diameter which is at least 1:100, preferably around 2:100 or greater, for example greater than or equal to 3:100. The hoop stretching of the pipe material causes orientation of the olefin (co)polymer material in the hoop direction and this stretching preferably should range from 25% to 400% and preferably is around 100%. The axial stretching of the pipe material preferably should range from 0% to 400%, more preferably about 30%, and causes orientation of the olefin (co)polymer material in the axial direction. By the bi-directional orientation of the (co) polymer material improved strength is imparted to the pipe, and due to the (co)polymer material being at least partly cross-linked when the orientation is effected, such orientation can be effected and maintained in a wide temperature range, typically from 135° C. to 250° C.

Further cross-linking can be effected after expansion of the tubular member on the expanded pipe at a position between calibrator 21 and balloon plug 18. This can be effected, for example, by gamma radiation or electron radiation of the pipe, but preferably is obtained by heating of the extruded pipe at said position, provided that there is a sufficient amount of cross-linking agent left in the material after the initial cross-linking obtained by heating of the (co)polymer material in the bipartite moulds.

Such reheating can be effected by means of circulating trains of heated concatenated mould halves as previously described and subsequent calibration and cooling between calibrator 21 and balloon plug 18. The further cross-linking after orientation of the (co)polymer material can provide increased dimensional stability against reversion of the orientation at higher temperatures.

Heating of the tubular member immediately downstream of the extrusion head can be dispensed with if the (co) polymer material is heated sufficiently in the extruder to be kept at the necessary temperature for a sufficient time for cross-linking to the desired degree to take place before orientation. It should also be understood that other means for holding the temperature of the extruded tubular member or for reheating the pipe, respectively, than heated circulating mould halves, e.g. a heating bath or dielectric heating, can be used. However, circulating mould halves are preferred, for example, in manufacturing oriented ribbed pipes.

Radial Expansion within the Die

Figure 2:
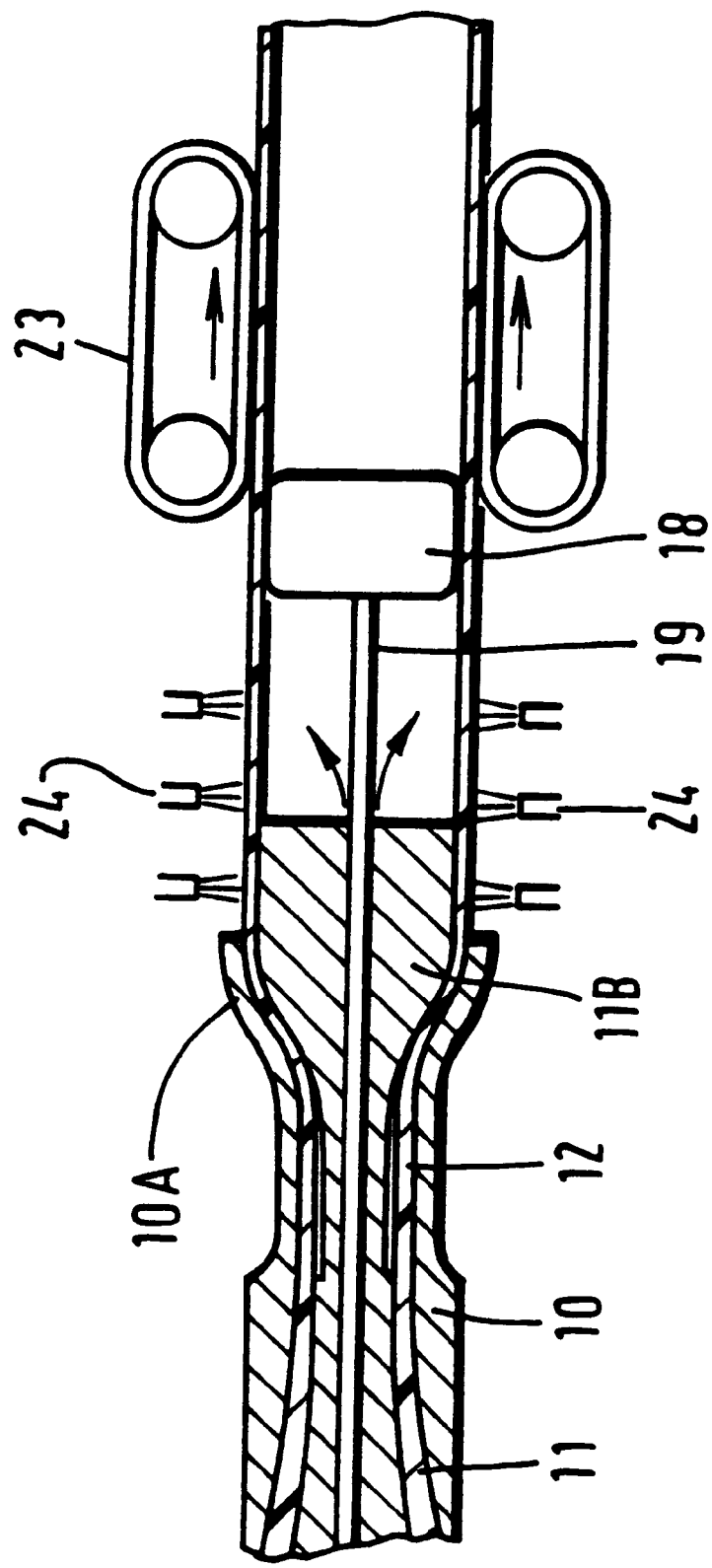
FIG. 2 shows a similar view of another embodiment of a pipe extrusion line for practising the method of the invention.

Free radial expansion of the tubular member is used in the embodiment described above, but the expansion can also be effected over a mandrel inside a jacket or similar device surrounding the tubular member as shown in FIG. 2.

The mandrel 11 is supported preferably through the extruder in order to avoid spider legs which leave weak spots in the material which begins to cross-link. The mandrel diameter is kept constant or increases continuously or step-wise until the final expansion starts at mandrel head 11*b*.

It is important that the heat flow from the hot tooling 10, 11 is prevented from reaching the low temperature area of the apparatus, comprising the extruder and the die entry. If necessary, suitable insulation should be provided. A typical temperature difference between the extruder screw end of the apparatus and the hottest end part of the tooling is 50 deg.C. or more.

In the embodiment of FIG. 2 mandrel 11 is extended to form a mandrel head 11B which widens conically in the flow direction of tubular extrudate 12 to expand said extrudate radially so as to stretch the plastics material in the hoop direction. The conical portion of mandrel head 11B joins a cylindrical portion for inside calibration of the pipe formed by expansion of the tubular extrudate. The mandrel head thus has a substantially S-shaped contour. Suitable angles of the conical part depend on the extrusion speed. Suitable values range from 5 degrees up to 30 degrees. Greater angles can easily lead to too fast a deformation speed which will cause the properties of the oriented article to deteriorate. Practical usable and preferred deformation speeds range from 0,002 to 5 s-1. Die 10 is extended to form a jacket 10A enclosing the tubular extrudate when passing from the extruder to and over the conical portion of mandrel head 11B. Thus, it will be seen that mandrel head 11B and jacket 10A define a space for the radial expansion of the tubular extrudate passing therethrough. The surfaces defining said space can be coated with a low friction material such as for example polytetrafluoroethylene.

Radial Expansion Onto a Mandrel After the Die

In this embodiment, the jacket of FIG. 2 can end close to the point where the conical portion begins. In this case speed controlled rollers could be provided in the vicinity of mandrel head 11B. Jacket 10A can be provided with electric heating elements on the outside thereof for heating the tubular extrudate as may be necessary in order to impart to said extrudate the temperature necessary for the desired cross-linking to take place when the tubular extrudate is passing through the jacket. Further cross-linking in this case can easily be achieved by extending the heated length of mandrel head 11B. Furthermore, the end part of jacket 10A can be cooled in order to give a shiny outside to the pipe and for the purpose of locking (preventing) excessive die swell. Also mandrel head 11B can be heated over the conically widening portion thereof and can be cooled downstream of said portion with a series of different cooling circuits. Cooling is needed to freeze the orientation but also because of the good surface finish it gives to the inside of the product. Throughout the process avoiding stick-slip flow is critical and correct temperatures of the sliding surfaces are essential to keep them slippery.

An optional bar 19 is connected to mandrel head 11B and anchors balloon plug 18 to the extruder, said head being located at the entrance end of take-up device 23. As in the embodiment previously described there are in bar 19 passages for supplying a gaseous fluid such as air or inert gas under pressure to balloon plug 18 and to the interior of the pipe formed after expansion of the tubular member. Between mandrel head 11B and balloon plug 18 there are provided nozzles 24 for sprinkling cooling water over the pipe both when it passes over the cylindrical portion of mandrel head 11B and when it has left said portion in order to rigidify the calibrated pipe.

The benefit of the mandrel process described that it can easily be used for both internally calibrated pipes (cooling extension of mandrel head 11B) and for externally calibrated pipes (with a similar arrangement as in FIG. 1). The need for plug 18 depends partly also from the lubrication system. In a preferred embodiment the pressurized fluid between plug 18 and mandrel head 11B, which can be used for forcing the still soft member against an outside calibrator, can function as a lubricant, at least for the start-up phase, between the inside of the member and the outside of the mandrel and the plug, respectively.

The cross-linking process can be initiated already at the end of the extruder, for example, inside die 10, by any suitable means, e.g. UV, if die 10 is made of glass. Also, radiation or electron beam cross-linking can be used. Then, the main part of cross-linking is carried out in the die or the bipartite moulds. The exact point where cooling of the member starts after expansion should be chosen with regard to the desired cross-linking in the expanded state. A long hot section in the mandrel head 11b serves the function of secondary cross-linking of the product in order to enhance its dimensional stability.

Known processes for stretching of plastic pipes, e.g. the process disclosed in DE 23 57 210, most often include a fairly long conical mandrel. In order to achieve high orientation rates shorter conical parts might be interesting. On the other hand, if the orientation takes place freely i.e. by means of a differential pressure over the wall of the tubular member, then said member can adopt an S-shaped curve, which is illustrated in EP 0563721, where it is used for free expansion after the die, the cross-section being close to inverted hyperbolic or parabola shape. This shape is often seen in film blowing, and results from a balance of modulus, drawing speed, temperature, wall thickness and draw ratio.

Figure 3:
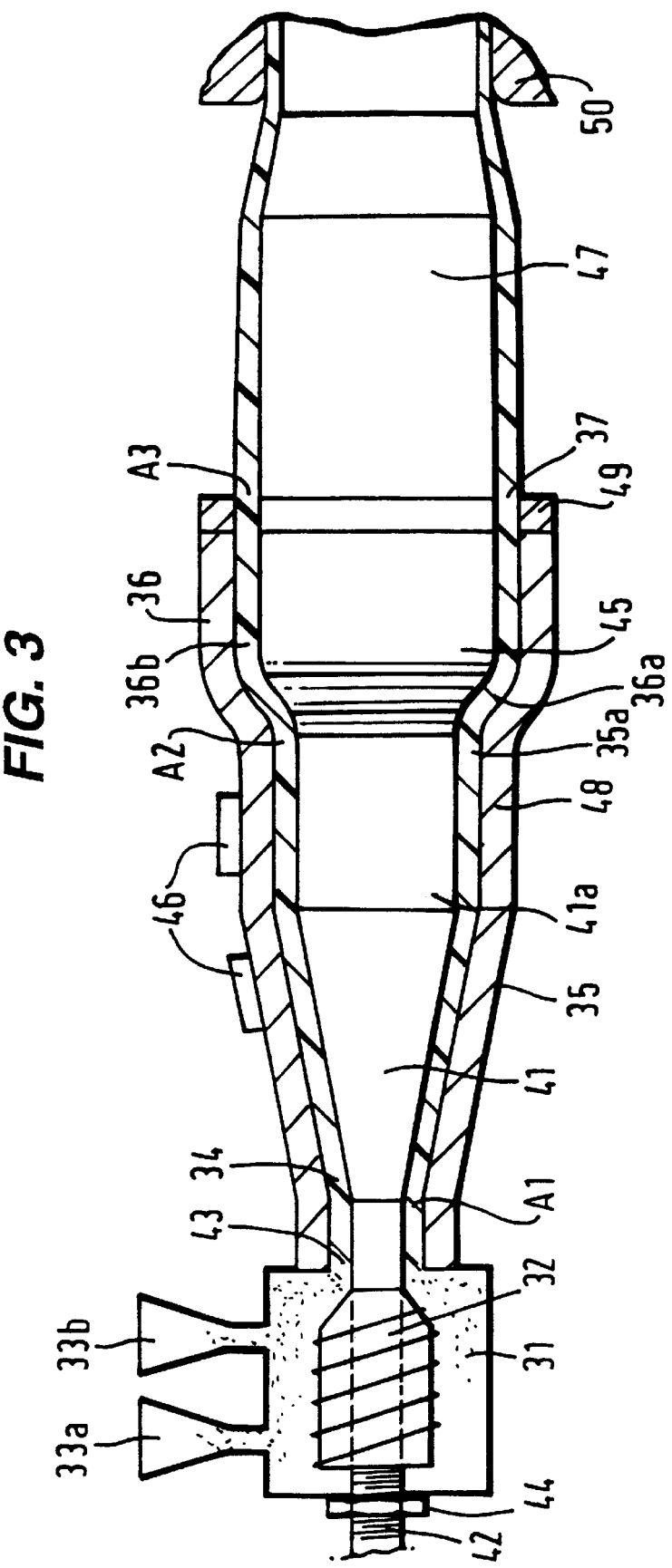
FIG. 3 shows a similar view of a further embodiment of a pipe extrusion line for practising the method of the invention.

Surprisingly, this shape is also effective as a form of mandrel in the closed die system of the present invention as illustrated in FIG. 3.

Without wishing to be bound by any particular theory, it is believed that the optional hydraulic lubricating agent, which can be injected at both sides of the tubular member, forms with this shape a natural, well balanced hydrodynamic cushion. The benefit of this form is that the likelihood of the material dragging on the mandrel is reduced. This has been found beneficial also where no lubricating agents are used but stable plug flow is achieved with coatings or by the use of internal lubricants. The tendency of high molecular weight material to flow in a so-called "slip-stick" fashion should be minimised as far as possible. In an analysis of extruded pipes, it has been observed that unsatisfactory pipes almost invariably show a flow pattern on their surfaces (not visible to the naked eye) which a Fourier transform analysis reveals to have an amplitude of 0.8 mm or more. In satisfactory pipes, with a steady plug flow in the tooling, no such pattern is found. In these cases, coatings which have good lubricity properties, for example, polytetrafluoroethylene, can be adequate. Low friction in the cavity area is important for the process to work. Very good results have been obtained using a cavity having a rough metal surface which has a diamond like surface (DLC), in which any irregularities have been filled with Teflon.

Liquid coatings can be used but generally are of very limited endurance. Hydraulic lubricating agents, for example, silicone-oil or glycol can however give excellent results. Also, internal lubrication of the polymer material can be effective. Suitable internal lubricants depend on the material to be processed but for example Acuflow (trade mark), fluorinated rubber compounds such as Viton (trade mark) and Dynamar (trade mark) can be used.

FIG. 3 shows an extrusion line wherein the polymeric material is oriented or aligned in the thermoplastic state prior to cross-linking and final orientation.

A conical extruder 31, for example as described in EP 0422042, is illustrated schematically. This extruder can permit the support of a mandrel through the extruder as preferred in certain embodiments of the invention. In addition, the extruder can produce a multiple layered product if desired. Other suitable extruders can, of course, be used as appropriate.

33a and 33b represent schematically different material feeds to the extruder, and 32 is a rotating double screw.

Through the extruder, a hollow shaft 42 is connected to a mandrel 41. Axial movement of the shaft can be adjusted by means of a nut 44.

The temperature of the material in the extruder is kept below the reaction (cross-linking) temperature up to the extruder orifice 43.

After the outlet 43 the polymeric material 34 enters a cavity means 35 defined by the mandrel 41 and an outer jacket 48. In this section, the diameter of the mandrel 41 is increased in order to orientate the molecules of the polymeric material. Initially, however, the temperature is still kept substantially below the reaction temperature.

At around the mid-point of the mandrel 41, or towards the end of its conical section, the temperature of the polymeric material is raised using the heaters 46 around the surrounding outer jacket 48. Further, or alternatively, heaters may be positioned inside the mandrel 41 (not shown). Any suitable heating method may be used, for example the outer jacket may comprise sections of material transparent to IR or RF radiation from suitable heating sources. In this heated section the reaction begins. The reaction time can be determined by the length of a cylindrical second part of the mandrel 41a. In some cases the cylindrical part 41a can be omitted or replaced by a section having a smoothly increasing or stepwise increasing diameter.

The polymeric material exits the discharge orifice 35a of the cavity means and enters the inlet end 36a of the die orifice 36b of the extruder die 36.

The extruder die 36 contains the final orientation mandrel 45, which is connected to the mandrel 41 and is also heated. The mandrel 45 has a smoothly increasing diameter, and a curved, substantially parabolic outer surface as shown. Alternatively, the entire conical die could also be smoothly conical with increasing diameter from flow area A1 to flow area A3, for example, having a cone angle of from about 3 to 30 degrees.

The extruder die can also optionally be provided with temperature control means for maintaining in the die orifice an axial temperature gradient descending in the direction of flow through a median die temperature substantially equal to the normal melting point of the polymeric material so that solidification of the polymeric material will be inhibited in the inlet end 36a of the die orifice and may be initiated within the die orifice 36b, for example, towards the die outlet 37.

The heated mandrel 45 is connected to a cooling mandrel 47 which gives a smooth inner wall to the extrudate and also freezes in the orientation produced in the polymeric material. For a similar purpose, the outer jacket 48 is provided with short cooling rings 49 at the die outlet 37.

In the example, the flow area A1 at the extruder outlet is substantially the same as flow areas A2 at the cavity means discharge orifice and A3 at the die outlet, and this configuration, in which there is substantially no increase in the cross-sectional area of flow, is preferred. In certain cases, however, the areas A2 and A3 can be smaller than A1. In general, the flow areas A2 and A3 are from 0.9 to 2.0 times the area of A1. Preferably the arrangement is such that the oriented polymeric material is constrained against its natural tendency to lose its molecular orientation by radial swelling.

When the polymeric material leaves the die outlet 37 (at A3) there may still be some cross-linking proceeding. This can be beneficial as it can reduce any tendency to shrink back.

After leaving the die outlet 37, the extruded polymeric pipe contacts the cooling mandrel 47 and from the cooling mandrel, the polymeric pipe enters a calibration sleeve 50. Within the calibration sleeve 50, or in the vicinity thereof, the pipe can be supported with a balloon type plug (not shown) for the purpose of inducing fluid pressure against the calibration sleeve. In order to reduce friction against the calibration sleeve wall water lubrication can be used. The calibration sleeve itself can have a serrated internal surface which can be coated, for example, with a friction reducing coating such as Teflon or diamond.

The haul off and cooling tanks of the apparatus are of conventional design and are not shown in the Drawing.

Orientation During Injection Moulding

Figure 4:
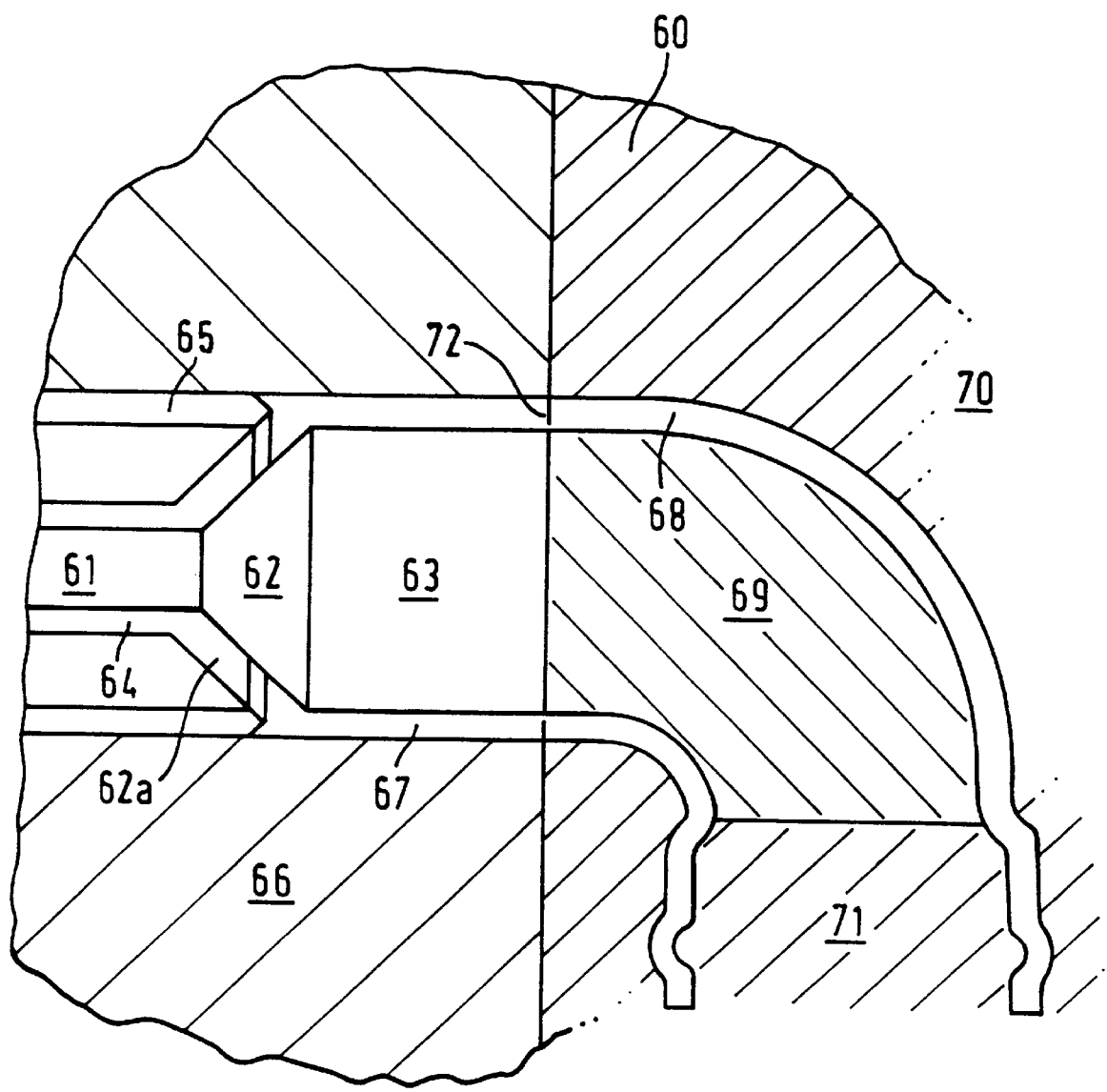
FIG. 4 shows an axial cross-sectional view of an embodiment of an injection moulding apparatus for practising the method of the invention.

FIG. 4 shows on example of a suitable set up for the injection moulding of cross-linked oriented plastics pipe bends. The injection moulding apparatus 60 comprises a body 66, surrounding a mandrel 61, 62, 63, in three sections. The first section 61 of the mandrel provides the non-oriented inner dimension of the pipe bend. The second section 62 is a heated conical section whereby the plastics material is radially expanded and oriented. The third section is a heated cylindrical section whereby further cross-linking of the plastics material can take place. The plastics material resides in passage 64, between the body 66 and the first section 61, and is conveyed by the action of the extruder screw (not shown) to the passage 67, via the conical passage 62a, between the body 66 and the mandrel section 62, in which it is oriented and cross-linked. The oriented and cross-linked plastics material received in the passage 67 is then forced by the action of the sleeve piston 65 (shown in its retracted position) into the injection mould 70. The mould has an "end gate" type opening 72 into the mould cavity 68, and has a core 69. As illustrated the mould also has a pipe bend socket section 71, which can be provided with a collapsible core (not shown).

A similar apparatus can be provided, in accordance with the invention, for producing an oriented blow moulded product. In this case, the mandrel section 63, the core 69 and the collapsible core of the socket section 71 can be replaced by a pressurisable fluid.

Examples of further extrusion apparatus and articles produced thereby which can advantageously be used in and produced by the method of the present invention are described and claimed in our copending International patent applications nos. PCT/FI96/00261 and PCT/FI96/00359, the entire disclosures of which are incorporated herein by reference for all purposes.

Figure 5:
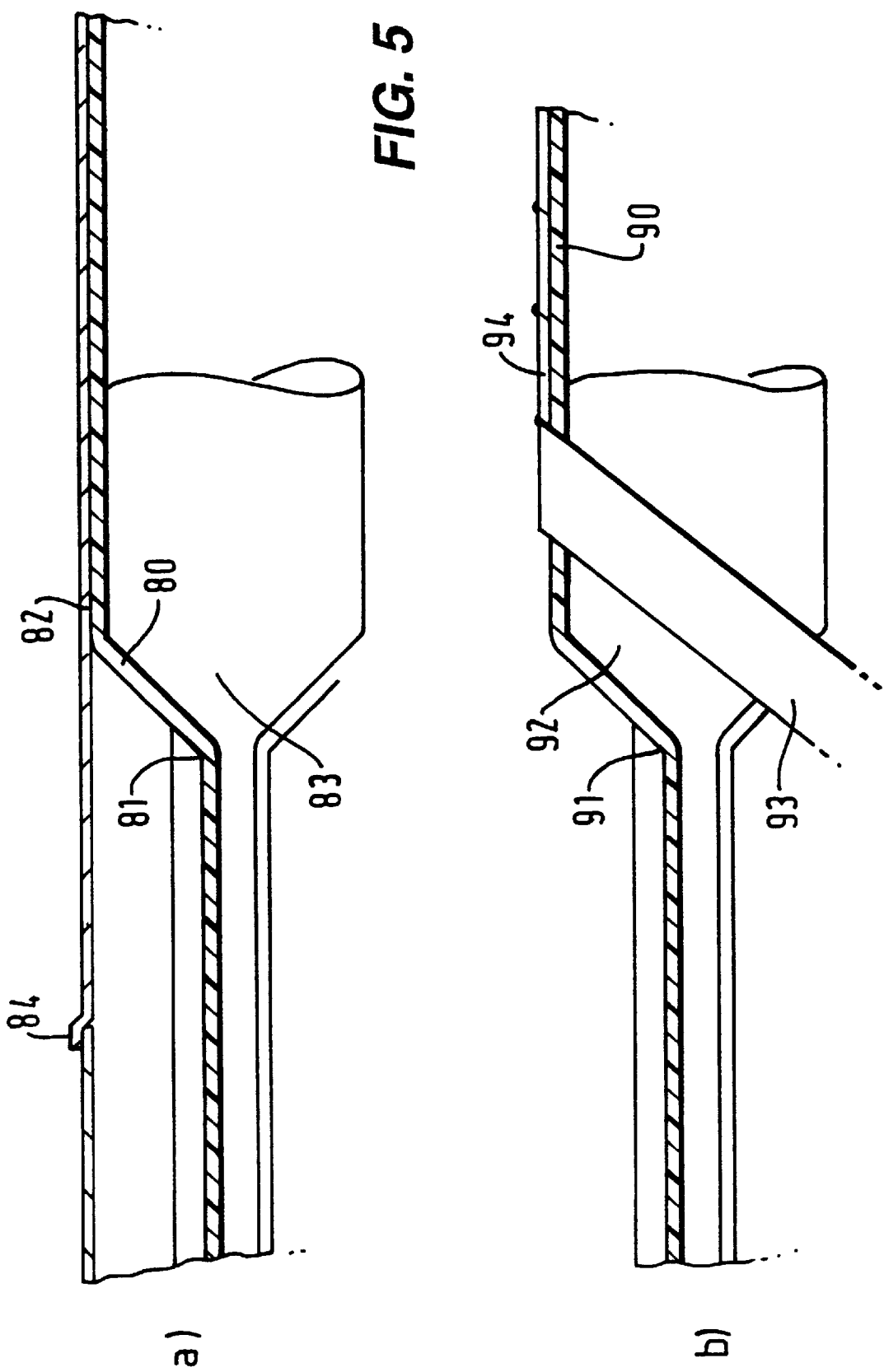

In FIG. 5(*a*) and (*b*) there are shown in fragmentary diagrammatic cross section two devices for the manufacture of a metal/plastics composite pipe. In FIG. 5(*a*) an extruded cross-linkable parison 80 issuing from an extruder die outlet 81 is pressed against a metal pipe 82 by means of a conical heated mandrel 83. The heated mandrel raises the temperature of the parison to the cross-linking temperature and at the same time orients the plastics material of the parison by giving it a diametral draw. The metal pipe is formed by helically winding a metal strip and welding or mechanically interlocking the lateral edges 84 of the strip. The metal pipe can be transported at the same speed as the extrusion speed, or faster, if it is desired to impart an axial draw to the plastics material.

FIG. 5(*b*) shows an alternative device in which an oriented plastics pipe 90 is formed by extruding a cross-linkable parison of plastics material from an extruder die 91, and cross-linking and simultaneously imparting a diametral draw to the plastics material of the parison by means of a conical heated mandrel 92. An outer metal or fibre reinforced plastics sleeve 94 is formed over the oriented plastics pipe by helically winding a strip 93 of metal or (fibre reinforced) plastics material of any suitable cross-section therearound.

Materials

The crystalline or semi-crystalline thermoplastic polymeric material can be, for example, an olefin (co)polymer which throughout this specification includes olefin homopolymers, copolymers or melt blends of two or more (co)polymers which either inherently or as a consequence of melt blending have the desired haul-off-tension, molecular weight and molecular weight distribution characteristics. Preferably the olefin (co)polymer to be extruded should have a density which is at least 900 kg/m3, more preferably above 920 and most preferably from 930 to 960 kg/m3. The definition of polyethylene in this context includes copolymers of ethylene with at most 5% by weight of an alkene-1 with 3 or more carbon atoms. In a preferred embodiment as described below the material is HD polyethylene with the addition of organic peroxides as cross-linking agents for cross-linking during extrusion, and phenolic antioxidants.

Preferably the additions of peroxides and antioxidants are each in total from 0.1–1.5% by weight of the polymeric material, preferably 0.3–0.5%.

Generally, the material to be crosslinked or vulcanized can be any crosslinkable extrudable material such as polyolefins, ethylene copolymers, vinyl polymers, polyamides, polyesters, polyurethanes, fluorinated polymers or co-polymers, and elastomers, in particular ethylene-propylene elastomers and some synthetic rubber compounds. Preferably the orientable crystalline or semi-crystalline thermoplastic polymeric material is a semi-crystalline polymer such as polyethylene, polypropylene or polyvinylidene fluoride, an amorphous crystallizing polymer such as polymethylmethacrylate or a crystallisable polymer such as polyvinylchloride, polyesters or polycarbonates. The starting materials can be in granulate or powdery form.

Useful polymers or comonomers which can be blended with the orientable thermoplastic polymeric material matrix (especially a polyolefin matrix) prior to extrusion in order to improve the properties of the oriented end product include, for example, ethylene vinyl acetate, EPDM-terpolymers, polybutadienes, copolymers of isobutylenes with conjugated dienes, mono- and polyfunctional acrylates and methacrylates, paraffin waxes, maleinates, especially ricinoloxazoline maleinate (OXA), maleinanhydride, styrene etc.

Typical cross-linking agents are different peroxides such as dicumyl peroxide and certain dimethacrylates and azo compounds. Also silanes can be used as cross-linking agents for cross-linking of material sections of the finished product in a water oven. For the outside of the product also cross-linking by irradiation or photoinitialized systems are available. Whichever cross-linking process is used, it may be advantageous to incorporate one or more co-curing agents for example polyunsaturated monomers such as triallyl cyanurate, diallyl phthalate, benzoquinone and ethylene glycol dimethacrylate. The cross-linking agent is preferably added to the polymeric material in an amount of at least 0.01% by weight, more preferably from 0.1 to 5% by weight, most preferably from 0.1 to 1.5% by weight, for example from 0.3 to 0.5% by weight.

By the addition of fillers such as fibres or flakes (e.g. mica) in the cross-linked layers and in the non cross-linked layers or in some layers only, for example, the heat deflection temperature (HDT) of the product can be increased. Any suitable discontinuous fibre may be used. Fibres which reinforce matrices generally include fibres having an average aspect ratio of 10–3000. Various types of organic and inorganic fibres are suitable either in monofilament or stranded form. Illustrative examples of satisfactory discontinuous fibres include polyamide, rayon, polyester, glass, asbestos, stainless steel, carbon, wollastonite and ceramic whiskers. Typical loading levels are from 10 to 30%.

Examples of useful laminar fillers include mica, talc and graphite flakes. Chalk, silica and fly ash may also be included. The amount of filler or fibre which may advantageously be included depends on the nature of the filler, but up to 50% may usefully be incorporated. Especially useful fillers are, for example, those that make the polymer conductive such as carbon black, react to dielectric heating methods such as induction or microwave heating or are (ferro)magnetic by nature.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

We claim:

1. A method of forming and continuously orienting an article comprising a crystalline or semi-crystalline thermoplastic polymeric material(s) at a temperature greater than the crystalline melting temperature of raid material(s), which comprises the steps of:

adding a chemically reactive substance(s) to the polymeric material before or during forming of either the entire article, or to one or more layers of a multilayer article, or to axial or helical stripes of the article, or to certain segments of the article in the axial direction;

plasticizing and forming a parison of the polymeric material(s) thus prepared at a temperature not high enough to activate the reaction of the said reactive substance(s);

optionally, inducing shear at least to the layer(s) where the chemically reactive substance(s) have been added to and/or stretching the still soft parison in one or both of two directions, simultaneously or stepwise, said stretching including axial draw to effect thermoplastic orientation of the material in the longitudinal direction of the parison and/or radial expansion to effect thermoplastic orientation of the material in the hoop direction of the parison;

decreasing the mobility of the molecules in the layer(s) to be oriented by activating a chemical reaction between the chemically reactive substance(s) and the polymeric material(s) having the chemically reactive substance(s) added thereto when the polymeric material(s) still is/are in a molten state;

inducing shear at least to the product, layer(s), stripes, or segments to which the chemically reactive substance(s) have been added and/or stretching the still soft, at least partly reacted parison in two directions, simultaneously or stepwise, said stretching comprising axial draw to effect orientation of the material in the longitudinal direction of the parison and radial draw to effect orientation of the material in the transverse direction of the parison;

calibrating and cooling the parison in the oriented condition to make the orientation permanent at least in the layer(s) where the chemical reaction(s) has taken place.

2. The method of claim 1, in which the said chemically reactive substance(s) when activated causes a reaction with the polymeric material(s) so that the new molecules have decreased mobility in the molten state because of steric hindrance.

3. The method of claim 1, in which the said chemically reactive substances comprises a cross-linking agent which is able to cross-link the polymer molecule chains.

4. The method of claim 1, in which the reaction needed for getting the material in permanently orientable state is activated with additional heat or radiation after initial thermoplastic orientation.

5. The method of claim 1, in which the mobility of the molecular chain is reduced at least in one of the layers close to or in the one to be oriented by the addition of inorganic or organic flake minerals or fibers or such material which will fibrillate during orientation.

6. The method of claim 1, in which the melt strength or the parison, needed for the axial and radial draw, is improved by the addition to one or more parts of the product of organic and/or inorganic fillers, for example, fibres or flake shaped minerals, which can also be oriented and which act like nucleating agents for the oriented crystallites if blended to the material in the oriented layer.

7. The method of claim 1, in which at least to the layers close to the or each layer to be oriented fibres and/or minerals have been added which respond to dielectric heating and this heating is used to rapidly increase the temperature in the layer containing the reactive substance(s) for the activation of the reaction(s).

8. The method of claim 1, in which at least to the layers not to be oriented organic and/or inorganic fibres or flake shaped minerals up to 10–50% by weight have been added and/or said layer is further cross-linked, with the same cross-linking method as during drawing or by another method, during the process and after it has reached its final dimensions to an additional gel content level of up to 80%.

9. The method of claim 1, in which the parison is first stretched in a thermoplastic state in order to get the molecular chains structured and substantially aligned and then again during/after the reaction phase, and this total draw, at least in the axial direction, is up to 600%.

10. The method of claim 1, in which the parison is extruded as a tubular member having a relationship between wall thickness and diameter which is greater than 2:100 and the axial and hoop orientations are in the same or different layers of the product.

11. The method or claim 1, in which the tubular member is exposed after initial orientation inside an extrusion tool to free axial and or radial expansion which is facilitated by maintaining a differential fluid pressure over the wall of the tubular member.

12. The method of claim 1, in which the article is blow moulded, and after leaving a die set, the parison is further stretched and oriented by blowing it into a cavity and the internal overpressure is fed into the cavity through an extruder.

13. The method of claim 1, in which the article is injection moulded.

14. The method of claim 1, in which the parison is pressed during further cross-linking against mould(s), which can be moving with said member, and said moulds are heated for holding the material at a cross-linking temperature.

15. The method of claim 1, in which the orientation takes place within a closed die.

16. The method of claim 1, in which the parison is exposed to radial expansion on a continuously or stepwise enlarging mandrel by drawing the parison over the mandrel.

17. The method of claim 1, in which the parison is enclosed by a jacket which is either heated or cooled and the material of the parison pushed with extrusion pressure through a die cavity, defined by the said mandrel and the said jacket, and the material is radially and axially oriented within the die cavity and a further axial draw is optionally applied to the enlarged extrudate exiting the die cavity.

18. The method of claim 1, in which the parison to cooled internally within a die set with an integral cooling mandrel, of substantially the same diameter as the stretching mandrel, and which may extend out of the die set.

19. The method of claim 1, in which the mobility of the molecule chains is reduced and hence the die swell is decreased by immediate slight cooling of the parison, coming out of a die set, with a water spray or an air flow before entering a calibration sleeve.

20. The method of claim 1, in which the extent to which the product is cross-linked and oriented is partly controlled by choosing the starting point of cooling in relation to the point where the final dimension of the product is reached, for example, by closing or activating cooling media circuits coupled to the jacket and mandrel of claim 17.

21. The method of claim 1, in which the plastics material to be crosslinked is a polyolefin composition comprising a higher melt flow rate olefin polymer or co-polymer having an average molecular weight (Mw) ranging from 30,000 to 1,000,000 g/mol and a lower melt flow rate olefin polymer or co-polymer having a molecular weight greater than 600,000 g/mol, where the difference in viscosity is, at least ten fold.

22. A method according to claim 1, wherein the orientation is carried out at a temperature within the range of from 135° C. to 250° C.

23. A method according to claim 1, for the production of wire and cable coatings.

24. A method for the production of an oriented crystalline or semi-crystalline thermoplastic polymeric article which comprises:

(i) heating A crystalline or semi-crystalline thermoplastic polymeric material to a temperature at or above—its crystalline melting point;

(ii) forming the polymeric material into an article whilst at a temperature at or above its crystalline—melting point;

(iii) subjecting the polymeric material to shear forces and/or stretching, either during or after the formation of the article to effect orientation of the polymeric material in the longitudinal and transverse directions;

(iv) reacting the polymeric material either before, during, or after the formation of the article, and either before or during orientation, or after orientation but before substantial relaxation of the orientation has taken place, with a crosslinking agent, or a grafting agent whereby stearic hindrance of polymer chain movement is increased;

the resultant article having a tensile strength in the directions of orientation greater than the tensile strength of an unoriented article formed from the polymeric material.

25. The method according to claim 24, wherein the article le an elongate hollow article.

26. The method according to claim 24, wherein the article is a hollow tubular article formed by extrusion.

27. The method according to claim 24, wherein the polymeric material is mixed with the crosslinking agent or grafting agent within an extruder.

28. The method according to claim 24, wherein the article has a wall thickness of greater than 0.8 mm, preferably greater than 2 mm.

29. The method according to claim 24, wherein the article is a tubular article and orientation is effected in both the longitudinal and the hoop directions.

30. The method according to claim 24, wherein the thermoplastic crystalline polymeric material is reacted with the crosslinking agent or the grafting agent in a first stage and then subjected to shear forces and/or stretching to effect orientation of the material in a second stage.

31. The method according to claim 24, wherein the crystalline thermoplastic polymeric material is subjected to shear forces and/or stretching to effect orientation of the material in a first stage and then reacted with the crosslinking agent or the grafting agent in a second stage before substantial relaxation of the orientation has taken place.

32. The method according to claim 24, wherein the crystalline thermoplastic polymeric material is subjected simultaneously to shear forces and/or stretching to effect orientation of the material and to crosslinking or grafting to increase steric hindrance of polymer chain movement.

33. The method of claim 24, wherein the crystalline thermoplastic polymeric material is subjected to radial expansion to effect orientation of the material in the hoop direction.

34. The method according to claim 24, wherein the crystalline thermoplastic polymeric material is reacted with the crosslinking agent or the grafting agent in an extruder, or in an extruder die, the degree of crosslinking of the polymeric material at the point where the extrudate leaves the die being at least 2%.

35. A method for the production of a multilayer tubular article comprising an oriented crystalline or semi-crystalline thermoplastic polymeric article which comprises:

forming a first material into tubular form by axially folding or helically wrapping a sheet of the first material, and then lining the first outer parison thus formed with a single or multilayer second inner parison comprising a crystalline or semi-crystalline polymeric material, wherein the said polymeric material is subjected to shear force and/or stretching to effect orientation of the polymeric material in the longitudinal and/or directions, and urged at a temperature at or above its crystalline melting point into contact with the inner surface of the first parison using a conical tool whilst substantially maintaining the orientation of the said polymeric material.

36. The method according to claim 35, wherein an outer layer of the inner parison is formed from an adhesion plastics material, preferably grafted PE, which comprises a foaming agent, and this outer layer is allowed to foam at least to such a degree that when an oriented inner layer of the inner parison shrinks to its diameter at ambient temperature the foamed outer layer fills the cavity formed between the inner surface of the outer parison and the outer surface of the said inner layer.

37. The method of claim 35, wherein the said foamed outer layer also comprises one or more fillers whereby the modulus of the foamed layer is increased such that when the said inner layer of the inner parison is subjected to pressure, the inner layer is supported by the outer parison through the foamed outer layer.

38. The method of claim 35, wherein the first material comprises a metal sheet or strip.

39. The method of claim 35, wherein the polymeric material is extruded into contact with the first parison and the first outer parison is transported at a speed higher than the extrusion speed, whereby the polymeric material coming into contact with the first parison is subjected to an axial draw and orientation.

40. An article comprising a crystalline or semi-crystalline polymeric material, in which at least part of the product is cross-linked or has grafted side chains or end groups creating steric hinderance and its permanently biaxially oriented at ambient temperature, the article having a tensile strength in the directions of orientation greater than the tensile strength of an unoriented article formed from the same polymeric material.

41. The Article of claim 40, that is a hollow elongate article.

42. The article of claim 33 or 41, in which said part forms one or more stripes along the axis of the product preferably in helical form.

43. The article of claim 40 in which said part forms concentric layers around the axis of the product.

44. The article of claim 41, in which the article has a wall which comprises at least two layers which are crosslinked by different methods and which show differing degrees of orientation.

45. The article of any of claim 33 to 44, in which the article forms a hollow geometric profile having a relationship between wall thickness and averages diameter which is greater than 1:100, preferably greater than 2:100.

46. The article of claim 40, in which the article comprises an oriented, cross-linked structural layer made or polyethylene having a pressure resistance at ambient temperature equal to a hydrostatic design base of at least 12 Mpa, preferably at least 16 Mpa.

47. The article of claim 40, in which the oriented and crosslinked part or parts make up more than half the volume of the article.

48. The article or claim 46, in which the article has an outer skin of plastic material which is substantially non-oriented, the thickness of said skin being 0.01 to 3 mm and having a high permeability.

49. The article of claim 46 or 48, in which the article has an inner skin of plastics material which is substantially non-oriented, said skin having a thickness of 0.01 to 10 mm and comprising a non-crosslinked layer having barrier properties different from those of the oriented and crosslinked layer(s) and preferably being impermeable to bi-products generated in the chemical reaction, e.g. cross-linking of other layers of the product.

50. The article of claim 46, in which a non-oriented part or parts and an oriented part or parts are made of the same polymeric material.

51. The article of claim 40, in which the plastics material of the oriented and crosslinked part or parts comprises a polyolefin composition comprising an olefin polymer or (co)polymer having an average molecular weight (Mw) ranging from 30.000 to 1.000.000, and an olefin polymer or (co)polymer having a molecular weight greater than 600,000 g/mol.

52. The article of claim 40, in which one or more parts of the article contain discontinuous fibres or flakes, which are also oriented.

53. The article of claims 41, in which the article is a multilayer bi-oriented article wherein in at least one layer of the article there is an interlacing orientation field, wherein the polymeric material is helically oriented or directed to form a reinforcing net like structure into the hollow article.

54. The article of claim 53, in which the interlacing orientation field comprises oriented liquid crystal plastics and/or crosslinked, oriented fibre like polyethylene molecule chains.

55. The article of claim 40, characterized in that when heated to a temperature above its crystalline melting point it shrinks less than would be predicted from its draw ratio.

56. The article of claim 40, in which the density of the oriented layer is higher than the density of said layer in its unoriented state.

57. The article of claim 40, in which the article comprises a pipe wherein at least one of the layers is also foamed and preferably cross-linked.

58. The article of claim 40, which comprises a metal layer.

59. The article of claim 58, in which the metal layer comprises a pipe or tube formed by folding or winding a metal sheet or strip.

60. The article at claim 58, which comprises an inner layer of an oriented polymeric material.

61. The article of claim 58, in which the article comprises an outer metal layer, an intermediate foamed adhesion layer and an inner oriented polymeric layer.

62. The article of claim 40, which comprises a cross-linked oriented pipe bond.

63. The article of claim 44, in which the article comprises a multilayer pipe comprising an oriented thick walled inner layer, a foam intermediate layer and a protective outer layer.

64. The article of claim 63, in which the foam density is below 500 kg/m$^3$ and the ring stiffness of the outer layer is lower than that of the inner layer.

65. A composite tubular article comprising a coil, or a coiled sheet or strip of metal having a thickness of from 0.2 mm to 5 mm, and an extruded tubular polymeric material arranged in one or more layers, the article having improved strength properties and at least part of the polymeric material being both cross-linked and permanently oriented at ambient temperature.

66. The composite article of claim 65, in which the article is a hollow article and in which outside the metal layer there is provided a layer of foamed polymeric material of thickness from 1 to 100 mm which provides both insulation and mechanical protection.

67. An extrusion apparatus for producing an oriented extruders of polymeric material, comprising;
   a) a plasticating extruder means for providing a melt(s) or partial melt(s) of said polymeric(s) material(s) and a chemically reactive substance and feeding said melt under pressure through a discharge opening in said extruder means;
   b) an elongational flow pattern-developing cavity means having an inlet opening communicating with said discharge opening of said extruder means, a flow cavity, and a discharge orifice, the relative geometries of said flow cavity and said discharge orifice being such as to develop within the molten polymer material flowing from said extruder means through said cavity means an elongational flow pattern which induces molecular orientation at least transversely to the direction of flow within said molten polymeric material;
   c) an orientation-retaining extrusion die means provided with an orifice extending therethrough, said die orifice having an inlet end and outlet end, said discharge orifice of said cavity means opening into said inlet end of said die orifice so as to permit flow of the oriented molten polymeric material from said cavity means into said die means, said discharge orifice having a cross-sectional area in the range of from 0.9 to 2.0 times the cross sectional area of said die orifice;
   d) temperature control means for maintaining the temperature of said flowing molten polymeric material below the reaction temperature of the said chemically reactive substance in the extruder and in at least a first part of said cavity means, and for maintaining the temperature of said flowing molten polymeric material above said reaction temperature in at least a second part of said cavity means and/or said inlet end of said die orifice;
   e) optionally, temperature control means for maintaining in said dip orifice an axial temperature gradient descending in the direction of flow through a median die temperature substantially equal to the normal melting point of said polymeric material so that solidification of said polymeric material will be inhibited in the entrance region of said die means and may be initiated within said die means; and
   f) optionally, a variable spend take-up means for withdrawing an extrudate of said polymeric material from said outlet end of said die orifice at a controlled draw rate;
the arrangement being such that said extrudate begins to solidify within said die means or after exiting from said outlet end of said die orifice but before any substantial radial swelling of said extradite can occur.

68. The extrusion apparatus of claim 67, wherein the die orifice has diametrically diverging geometry and converging walls and orifice area, whereby the polymer material is substantially simultaneously elongated circumferentially and axially.

69. The extrusion apparatus of claim 67, in which the cavity means comprises a mandrel which is fixed in such a manner that the cross-section of the flow cavity is kept substantially constant from the screw end of the extruder to the point where stretching of the plastics material starts.

70. The extrusion apparatus of claim 69, in which the mandrel is supported by the body of the extruder through the screw and/or optionally, through the solidified wall of the polymeric material extrudate, by the calibrator.

71. The extrusion apparatus of claim 67, in which the flow passage is free of obstacles capable of forming weld lines in the extrudate at least in the heated regions wherein the temperature is above the reaction temperature.

72. The extrusion apparatus of claim 67, in which the diameter of the mandrel is substantially constant from the extruder outlet to the point where stretching starts, and, optionally, at its other extremity is substantially constant from the point at which the extrudate begins to solidify up to the calibrator.

73. The extrusion apparatus of claim 67, in which the mandrel forms a conically widening portion.

74. The extrusion apparatus of claim 73, in which an outer jacket extends at least partly over said conically widening portion.

75. The extrusion apparatus of claim 74, in which the mandrel is heated over a portion, including said conically widening portion, and downstream thereof is cooled.

76. A method of producing a pressure pipe, the method comprising:
   forming said pipe of a material comprising an at least partially cross-linked crystalline or semi-crystalline thermoplastic polymeric material, which is biaxially oriented.

77. The method according to claim 76, wherein the polymeric material is a polyolefin.

78. The method according to claim 77, wherein the polyolefin is polyethylene.

79. The method according to claim 76, wherein the pressure pipe is of multilayered construction, at least one of the layers comprising an at least partially cross-linked biaxially oriented crystalline and semi-crystalline thermoplastic polymeric material.

80. The method according to claim 76, wherein the orientation is effected at a temperature within the range of from 135° C. to 250° C.

81. The method according to claim 76, wherein the polymeric material is oriented in the hoop direction by stretching by from 25% to 400%, and in the axial direction by stretching by up to 400%.

82. A composite tubular article comprising a coil, or a coiled sheet or strip of metal having a thickness of from 0.2 mm to 0.5 mm, and an extruded tubular polymeric material arranged in one or more layers, the article having improved strength properties and at least part of the polymeric material being both cross-linked and permanently oriented at ambient temperature, wherein the article is a hollow article and in which the ring stiffness of the polymeric material layer is sufficiently high with respect to ring stiffness of the metal layer such that when the hollow article is deformed and the deformation stress is removed, the hollow article recovers at least partially elastically to its original form.

83. A composite tubular article comprising a coil, or a coiled sheet or strip of metal having a thickness of from 0.2 mm to 0.5 mm, and an extruded tubular polymeric material arranged in one or more layers, the article having improved strength properties and at least part of the polymeric material being both cross-linked and permanently oriented at ambient temperature, wherein the article is an electrofusion pipe fitting, the shoot, strip, or coil of metal comprises an electrofusion heating element, and the fitting has a body comprising the oriented, cross-linked polymeric material.

84. A method of producing a pressure pipe, the method comprising:

forming the pipe of a material comprising an at least partially cross-linked crystalline or semi-crystalline thermoplastic polymeric material, wherein the polymeric material is biaxially oriented; and further cross-linking the polymeric material after orientation.

* * * * *